United States Patent [19]

Gilhousen et al.

[11] Patent Number: 5,280,472
[45] Date of Patent: Jan. 18, 1994

[54] CDMA MICROCELLULAR TELEPHONE SYSTEM AND DISTRIBUTED ANTENNA SYSTEM THEREFOR

[75] Inventors: Klein S. Gilhousen, San Diego; Franklin P. Antonio, Del Mar, both of Calif.

[73] Assignee: Qualcomm Incorporated, San Diego, Calif.

[21] Appl. No.: 849,651

[22] Filed: Mar. 9, 1992

Related U.S. Application Data

[63] Continuation of Ser. No. 624,118, Dec. 7, 1990, abandoned.

[51] Int. Cl.⁵ .............................................. H04J 13/00
[52] U.S. Cl. ..................................... 370/18; 342/375; 375/1; 455/279.1
[58] Field of Search ............... 370/18, 93, 19; 375/1; 380/34; 455/273, 278.1, 279.1, 276.1; 343/853; 342/375

[56] References Cited

U.S. PATENT DOCUMENTS

| | | | |
|---|---|---|---|
| 4,383,327 | 5/1983 | Timor | 370/93 |
| 4,475,215 | 10/1984 | Gutleber | 370/18 |
| 4,672,658 | 6/1987 | Kavehrad et al. | 379/63 |
| 4,761,778 | 8/1988 | Hui | 370/60 |
| 4,841,527 | 6/1989 | Raychaudhuri | 371/32 |
| 4,901,307 | 2/1990 | Gilhousen | 370/18 |
| 4,920,348 | 4/1990 | Baghdady | 455/283 X |
| 4,984,247 | 1/1991 | Kaufmann | 375/1 |
| 5,046,066 | 9/1991 | Messenger | 370/18 |
| 5,056,109 | 10/1991 | Gilhousen et al. | 375/1 |
| 5,073,900 | 12/1991 | Mallinckrodt | 370/18 |
| 5,101,501 | 3/1992 | Gilhousen et al. | 375/1 X |
| 5,103,459 | 4/1992 | Gilhousen et al. | 375/1 |
| 5,109,390 | 4/1992 | Gilhousen et al. | 375/1 |

Primary Examiner—Douglas W. Olms
Assistant Examiner—Melvin Marcelo
Attorney, Agent, or Firm—Russell B. Miller; Katherine W. Walker

[57] ABSTRACT

A code division multiple access (CDMA) communication system in which cellular techniques are utilized in a wireless Private Branch Exchange (PBX) environment. A microcellular arrangement is defined in which a base station communicates user information signals using CDMA communication signals with subscriber terminals. A distributed antenna system is utilized in the system to provide multipath signals which facilitate signal diversity for enhanced system performance.

37 Claims, 4 Drawing Sheets

CDMA MICROCELLULAR TELEPHONE SYSTEM AND DISTRIBUTED ANTENNA SYSTEM THEREFOR

This is a continuation of application Ser. No. 07/624,118, filed Dec. 7, 1990 abandoned.

BACKGROUND OF THE INVENTION

I. Field of the Invention

The present invention relates to wireless PBX and wireless local loop telephone systems. More specifically, the present invention relates to a novel and improved microcellular telephone system and distributed antenna system therefor so as to facilitate indoor communications using spread spectrum communication signals.

II. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. However the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference.

In the just mentioned patent, a multiple access technique is disclosed where a large number of mobile telephone system users each having a transceiver communicate through satellite repeaters or terrestrial base stations (also referred to as cell-sites stations, cell-sites or for short, cells) using code division multiple access (CDMA) spread spectrum communication signals. In using CDMA communications, the frequency spectrum can be reused multiple times thus permitting an increase in system user capacity. The use of CDMA results in a much higher spectral efficiency than can be achieved using other multiple access techniques.

The terrestrial channel experiences signal fading that is characterized by Rayleigh fading. The Rayleigh fading characteristic in the terrestrial channel signal is caused by the signal being reflected from many different features of the physical environment. As a result, a signal arrives at a mobile unit receiver from many directions with different transmission delays. At the UHF frequency bands usually employed for mobile radio communications, including those of cellular mobile telephone systems, significant phase differences in signals traveling on different paths may occur. The possibility for destructive summation of the signals may result, with on occasion deep fades occurring.

Terrestrial channel fading is a very strong function of the physical position of the mobile unit. A small change in position of the mobile unit changes the physical delays of all the signal propagation paths, which further results in a different phase for each path. Thus, the motion of the mobile unit through the environment can result in a quite rapid fading process. For example, in the 850 MHz cellular radio frequency band, this fading can typically be as fast as one fade per second per mile per hour of vehicle speed. Fading this severe can be extremely disruptive to signals in the terrestrial channel resulting in poor communication quality. Additional transmitter power can be used to overcome the problem of fading. However, such power increases effect both the user, in excessive power consumption, and the system by increased interference.

The CDMA modulation techniques disclosed in U.S. Pat. No. 4,901,307 offer many advantages over narrow band modulation techniques used in communication systems employing satellite or terrestrial repeaters. The terrestrial channel poses special problems to any communication system particularly with respect to multipath signals. The use of CDMA techniques permit the special problems of the terrestrial channel to be overcome by mitigating the adverse effect of multipath, e.g. fading, while also exploiting the advantages thereof.

In a CDMA cellular telephone system, the same wide band frequency channel can be used for communication in all cells. The CDMA waveform properties that provide processing gain are also used to discriminate between signals that occupy the same frequency band. Furthermore the high speed pseudonoise (PN) modulation allows many different propagation paths to be separated, provided the difference in path delays exceed the PN chip duration, i.e. 1/bandwidth. If a PN chip rate of approximately 1 MHz is employed in a CDMA system, the full spread spectrum processing gain, equal to the ratio of the spread bandwidth to system data rate, can be employed to discriminate against paths that differ by more than one microsecond in path delay from each other. A one microsecond path delay differential corresponds to differential path distance of approximately 1,000 feet. The urban environment typically provides differential path delays in excess of one microsecond, and up to 10–20 microseconds are reported in some areas.

In narrow band modulation systems such as the analog FM modulation employed by conventional telephone systems, the existence of multiple paths results in severe multipath fading. With wide band CDMA modulation, however, the different paths may be discriminated against in the demodulation process. This discrimination greatly reduces the severity of multipath fading. Multipath fading is not totally eliminated in using CDMA discrimination techniques because there will occasionally exist paths with delayed differentials of less than the PN chip duration for the particular system. Signals having path delays on this order cannot be discriminated against in the demodulator, resulting in some degree of fading.

It is therefore desirable in the CDMA cellular telephone system that some form of diversity be provided which would permit a system to reduce fading. Diversity is one approach for mitigating the deleterious effects of fading. Three major types of diversity exist: time diversity, frequency diversity and space diversity.

Time diversity can best be obtained by the use of repetition, time interleaving, and error detection and correction coding which is a form of repetition. The present invention employes each of these techniques as a form of time diversity.

CDMA by its inherent nature of being a wideband signal offers a form of frequency diversity by spreading the signal energy over a wide bandwidth. Therefore, frequency selective fading affects only a small part of the CDMA signal bandwidth.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in copending U.S. patent application entitled "SOFT HANDOFF IN A CDMA CELLULAR TELEPHONE SYSTEM", Ser. No. 07/433,030, filed Nov. 7, 1989, now U.S. Pat. No. 5,101,501 issued Mar. 31, 1992 and copending U.S. patent application entitled "DIVERSITY RECEIVER IN A CDMA CELLULAR TELEPHONE SYSTEM", Ser. No. 07/432,552, also filed Nov. 7, 1989, now U.S. Pat. No. 5,109,390 issued Apr. 28, 1992, both assigned to the assignee of the present invention.

The deleterious effects of fading can be further controlled to a certain extent in a CDMA system by controlling transmitter power. A system for cell-site and mobile unit power control is disclosed in copending U.S. patent application entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, now U.S. Pat. No. 5,056,109, issued Oct. 8, 1991, also assigned to the assignee of the present invention.

The CDMA techniques as disclosed in U.S. Pat. No. 4,901,307 contemplated the use of coherent modulation and demodulation for both directions of the link in mobile-satellite communications. Accordingly, disclosed therein is the use of a pilot carrier signal as a coherent phase reference for the satellite-to-mobile link and the cell-to-mobile link. In the terrestrial cellular environment, however, the severity of multipath fading, with the resulting phase disruption of the channel, precludes usage of coherent demodulation technique for the mobile-to-cell link. The present invention provides a means for overcoming the adverse effects of multipath in the mobile-in-cell link by using noncoherent modulation and demodulation techniques.

The CDMA techniques as disclosed in U.S. Pat. No. 4,901,307 further contemplated the use of relatively long PN sequences with each user channel being assigned a different PN sequence. The cross-correlation between different PN sequences and the autocorrelation of a PN sequence for all time shifts other than zero both have a zero average value which allows the different user signals to be discriminated upon reception.

However, such PN signals are not orthogonal. Although the cross-correlations average to zero, for a short time interval such as an information bit time the cross-correlation follows a binomial distribution. As such, the signals interfere with each other much the same as if they were wide bandwidth Gaussian noise at the same power spectral density. Thus the other user signals, or mutual interference noise, ultimately limits the achievable capacity.

The existence of multipath can provide path diversity to a wideband PN CDMA system. If two or more paths are available with greater than one microsecond differential path delay, two or more PN receivers can be employed to separately receive these signals. Since these signals will typically exhibit independence in multipath fading, i.e., they usually do not fade together, the outputs of the two receivers can be diversity combined. Therefore a loss in performance only occurs when both receivers experience fades at the same time. Hence, one aspect of the present invention is the provision of two or more PN receivers in combination with a diversity combiner. In order to exploit the existence of multipath signals, to overcome fading, it is necessary to utilize a waveform that permits path diversity combining operations to be performed.

A method and system for constructing PN sequences that provide orthogonality between the users so that mutual interference will be reduced is disclosed in copending U.S. patent application entitled "SYSTEM AND METHOD FOR GENERATING SIGNAL WAVEFORMS IN A CDMA CELLULAR MOBILE TELEPHONE SYSTEM", Ser. No. 07/543,496, filed Jun. 25, 1990, now U.S. Pat. No. 5,103,459 issued Apr. 7, 1992 also assigned to the assignee of the present invention. Using these techniques in reducing mutual interference allowing higher system user capacity and better link performance. With orthogonal PN codes, the cross-correlation is zero over a predetermined time interval, resulting in no interference between the orthogonal codes, provided only that the code time frames are time aligned with each other.

In an such a CDMA cellular mobile system as disclosed in Ser. No. 07/543,496, signals are communicated between a cell-site and mobile units using direct sequence spread spectrum communication signals. In the cell-to-mobile link, pilot, sync, paging and voice channels are defined. Information communicated on the cell-to-mobile link channels are, in general, encoded, interleaved, bi-phase shift key (BPSK) modulated with orthogonal covering of each BPSK symbol along with quadrature phase shift key (QPSK) spreading of the covered symbols. In the mobile-to-cell link, access and voice channels are defined. Information communicated on the mobile-to-cell link channels are, in general, encoded, interleaved, orthogonal signalling along with QPSK spreading. Using orthogonal PN sequences does in fact reduce mutual interference, thereby permitting greater user capacity, in addition to supporting path diversity so as to overcome fading.

The above mentioned patent and patent applications disclose a novel multiple access technique wherein a large number of mobile telephone system users communicate through satellite repeaters or terrestrial base stations using code division multiple access spread spectrum modulation that allows the spectrum to be reused multiple times. The resulting system design has a much higher spectral efficiency than can be achieved using previous multiple access techniques.

In cellular telephone systems, a large geographic area is provided with mobile telephone service by installing a number of cell-sites situated so as to provide coverage of the entire geographic area. If service demand exceeds the capacity that can be provided by a set of cell-sites that just provides coverage, the cells are subdivided into smaller cells. This process has been carried out to the extent that some major metropolitan areas have nearly 200 cell-sites.

The technique described in U.S. Pat. No. 4,901,307 uses CDMA to achieve a very high capacity by providing marginal isolation gain through the exploitation of system characteristics and functions such as multiple steerable antennas, speech activity and reuse of the entire frequency band in every cell of the system. The result is a significantly higher system capacity than provided by other multiple access techniques such as FDMA and TDMA.

In a further development of the cellular telephone idea, it is desired to provide a number of very small cells, called microcells, which would provide coverage of a very limited geographic area. Usually, it is considered that such areas are limited to a single floor of an office building and the mobile telephone service can be viewed as a cordless telephone system that may or may not be compatible with the mobile cellular telephone system. The rationale for providing such a service is similar to the reasoning for use of Private Branch Exchange (PBX) systems in business offices. Such systems provide for low cost phone service for a large number of calls between phones within the business while providing simplified dialing for internal phone numbers. A few lines are also provided to connect the PBX system to the public telephone system, allowing calls to be made and received between phones in the PBX system and telephones located elsewhere. It is desirable for the microcell system to provide a similar level of service but with the added feature of cordless operation anywhere within the service area of the PBX.

In applications such as the wireless PBX or Wireless local loop telephone systems path delays are much shorter in duration than in cellular mobile systems. In buildings and other indoor environments where PBX systems are used it is necessary to provide a form of diversity which will enable discrimination between CDMA signals.

The primary problem solved by the disclosed invention is the provision of a simple antenna system that provides high capacity, simple installation, good coverage and excellent performance. Another problem is to achieve the above limited coverage while maintaining compatibility with the mobile cellular system and while taking a negligible amount of capacity away from the mobile system. This is achieved in the disclosed invention by combining the capacity properties of CDMA with a new distributed antenna design that confines the radiation to a very limited and carefully controlled area.

The implementation of spread spectrum communication techniques, particularly CDMA techniques, in a PBX environment therefore provides features which vastly enhance system reliability and capacity over other communication system techniques. CDMA techniques as previously mentioned further enable problems such as fading and interference to be readily overcome. Accordingly, CDMA techniques further promote greater frequency reuse, thus enabling a substantial increase in the number of system users.

SUMMARY OF THE INVENTION

A key aspect in the wireless PBX and the wireless local loop of the present invention is the CDMA distributed antenna. In this concept, a set of simple antennas are fed by a common signal with only time delay processing to distinguish signals. The transmit output of the cell transmitter is fed down a coaxial cable to a string of radiators. The radiators are connected to the cable using power splitters. The resulting signals, amplified as necessary, are fed to the antennas. The salient features of this antenna concept are: (1) extremely simple and inexpensive; (2) neighboring antennas have time delays inserted in feed structure so signals received from two antennas are distinguishable by PN temporal processing; (3) exploits direct sequence CDMA's ability to discriminate against multipath; and (4) creates deliberate multipath that satisfies discrimination criteria.

In the distributed antenna processing, each antenna taps into the distribution cable somewhat like a cable TV system. Broadband gain is provided as needed at the antennas or at the cable taps. Note that the cable system will usually consist of two cables, one for transmit signals and one for receive signals. In many cases, the necessary delay will be provided naturally by the distribution cable and no additional delay elements will be necessary. When additional delay is necessary, it will usually prove simplest to coil up a length of coaxial cable.

A very important feature of this architecture is that no signal specific processing is necessary. In particular, no filtering, mixing translation or other complex signal processing operations need be performed. Only amplification is needed and that is provided "in bulk" to all of the signals in the cable with a single amplifier.

Another advantage is that little site specific engineering is required for installation. Normally, antenna placement will be determined only by physical constraints, together with the requirement that every location desiring service must be covered by at least one antenna. There is no concern for overlap. In fact, overlapping coverage is desirable in that it provides diversity operation to all terminals in the overlap area. Overlap is, however, not required.

The advantages of the distributed antenna concept become clear when considering the inherent simplicity of the cell equipment required to support a wireless PBX, wireless local loop or wireless home extension phone.

For the initial installation of a wireless PBX in a hotel or office building it is probable that a system capable of handling up to 40 simultaneous calls will be adequate. For a system of this capacity, only a single wideband (1.25 MHz bandwidth) receiver/transmitter needs to be provided. A single receiver/transmitter is then coupled into the antenna system drive cable. As described, this can be a single serial string of antenna elements.

Another possible antenna approach allows two or more cables to be driven in parallel by the receiver/transmitter with the necessary delay elements located with the receiver/transmitter equipment. As the capacity demand for a single system grows beyond 40 simultaneous calls, the system can be expanded in two different dimensions.

First, and simplest is the use of additional wideband frequency channels. In the cellular telephone application, the total 12.5 MHz bandwidth available for each direction for each carrier is subdivided into up to ten different 1.25 MHz wideband channels. For example, to double capacity to 80 simultaneous calls without changing the antenna system, a second receiver/transmitter unit would be added along with the necessary digital channel unit/vocoder equipment. If the entire spectrum of ten channels is not required for CDMA, then the remainder can be used by analog FM (or even digital TDMA) using the standard 30 kHz channelization.

If it is desired to increase capacity without using additional frequency spectrum then the antenna subsystem can be subdivided into "pseudo-sectors." In this architecture, the antenna drive cable in divided so as to provide two or more ports. Normally, you would try to have the antennas in each of the pseudo-sectors to be relatively disjoint from each other, although this is not critical. Each of the pseudo-sector is then provided with its own receiver/transmitter unit. The digitized sample bus output of the receiver/transmitters is fed to all of the channel units.

The channel units, as they are designed for cellular service, provide for up to three sector bus connections. In cellular service, this would allow three adjoining sectors of a cell to be connected to a channel unit. The channel unit provides diversity combining of signals from all three sectors at the symbol level, thus providing a very high level of diversity combining. In the wireless PBX application, three antenna strings serving adjoining service areas could be connected to these three busses. This would allow a "soft handoff" without switch intervention to be accomplished between any of the antennas in the three antenna strings. This has the advantage of "hiding" the handoff process from the switch and allows the switch to be a generic PBX.

Clearly, the above architecture could be allowed to grow to great size. With ten wideband channels in use in three "pseudo-sectors", approximately 1200 simultaneous calls could be processed. This could be serving on the order of 15,000 lines corresponding to a large size central office capacity. Growth beyond this capacity is also possible but the switching architecture would, of necessity, begin to take on some of the characteristics and requirements of a cellular system.

The CDMA system described above for the Wireless PBX application can also be applied essentially unchanged to the wireless local loop problem. In wireless local loop applications it is desired to provide improved telephone service to a (generally) built up area with small cost and ease of installation of the necessary infrastructure. The wireless local loop equipment would be co-sited with the central office switch serving the area.

The vocoders, channel units and receiver/transmitters would all be located together at the same facility as the switch. The receiver/transmitter(s) would be coupled to the distributed antenna system as described above. In this system, the RF signals for both in-bound and out-bound signals pass through a pair of cables. The cables are tapped periodically to drive radiating elements. The cable taps may or may not require the use of amplification to maintain signal levels.

The home telephone unit for interface with the wireless local loop would consist of a low cost CDMA mobile phone modified for use with mains power and a simple fixed antenna. The telephone handset would plug into this RF unit. The simplicity of the user equipment would be completely consistent with user installation. The customer would simply take it home, open the box, plug it in and begin to make calls.

The architecture of the system allows for a simple evolution as the market is penetrated. The service could begin with a single omnidirectional antenna located at the equipment site. This antenna would be mounted on a high tower so as to provide coverage of the area. Note that the first objective with initial service is universal coverage of the service area so that all customers desiring service may subscribe.

Then, as demand causes the need for additional capacity, the antennas could be sectorized. As demand grows still greater, the most dense sectors can be replaced with the distributed antenna. The distributed antenna will allow higher capacity because interference from adjacent cells is reduced and because subscriber units may operate a lower power and generate less interference to neighboring cells.

Mobile service can also be provided by this system if provision is made for appropriate connections between adjacent central offices for handoff if the user moves from one central office's service area to another. This handoff can be made soft in the manner provided by the CDMA cellular system with the use of the appropriate software and hardware between the central office switches.

BRIEF DESCRIPTION OF THE DRAWINGS

The features, objects, and advantages of the present invention will become more apparent from the detailed description set forth below when taken in conjunction with the drawings.

DETAILED DESCRIPTION OF THE PREFERRED EMBODIMENTS

In a CDMA wireless telephone system, a microcell has a controller, a plurality of spread spectrum modulator-demodulator units, which are also referred to as channel unit or modems, a transceiver and a distributed antenna system. Each channel unit consists of a digital spread spectrum transmit modulator, a digital spread spectrum data receiver and a searcher receiver. Each modem at the microcell is assigned to a mobile unit as needed to facilitate communications with the assigned mobile unit. The term "mobile unit" or subscriber terminal as used with reference to the microcellular system is generally a CDMA telephone set that is configured as a hand-held personal communications device, a portable CDMA telephone or even a CDMA telephone that is fixed at a specific location.

In the CDMA wireless PBX or local loop telephone system, the microcell transmits a "pilot carrier" signal. The pilot signal is used by the mobile units to obtain initial system synchronization and to provide robust time, frequency and phase tracking of the microcell transmitted signals. Each microcell also transmits spread spectrum modulated information, such as microcell identification, system timing, mobile paging information and various other control signals.

Upon acquisition of the pilot signal, i.e. initial synchronization of the mobile unit with the pilot signal, the mobile unit searches for another carrier intended to be received by all system users in the cell. This carrier, called the synchronization channel, transmits a broadcast message containing system information for use by the mobiles in the system. The system information identifies the microcell and the system in addition to conveying information which allows the long PN codes, interleaver frames, vocoders and other system timing information used by the mobile mobile unit to be synchronized without additional searching. Another channel, called the paging channel may also be provided to transmit messages to mobile units indicating that a call has arrived for them, and to respond with channel assignments when a mobile initiates a call.

When a call is initiated, a pseudonoise (PN) code address is determined for use during the course of this call. The code address may be either assigned by the microcell or be determined by prearrangement based upon the identity of the mobile unit.

Figure 1:
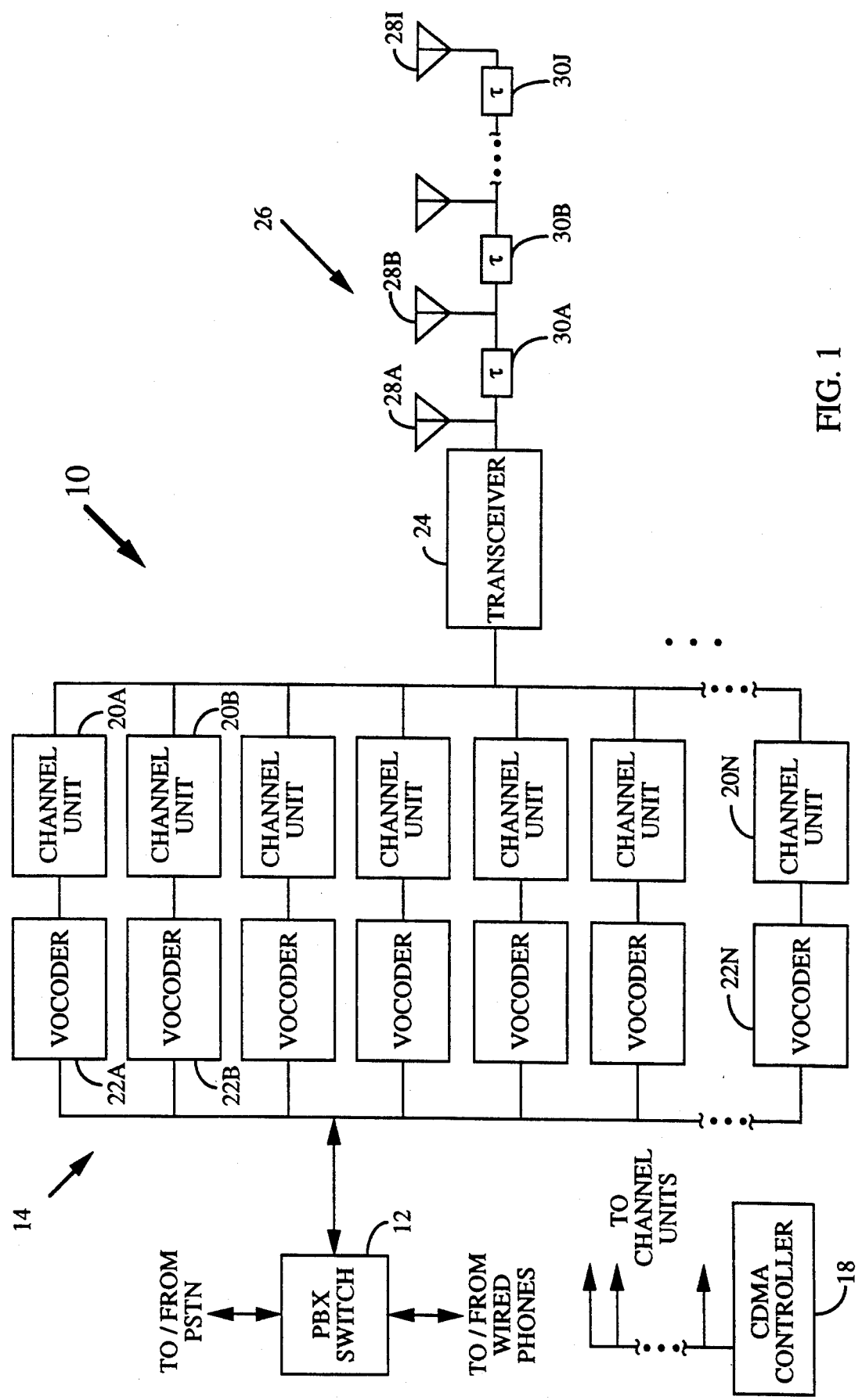
FIG. 1 is a schematic overview of an exemplary CDMA wireless PBX telephone system.

In FIG. 1, wireless base station 10 is illustrated which includes PBX switch 12 and microcell 14. PBX switch 12 is used in interfacing base station 10 to the public switched telephone network (PSTN) and/or PBX system wired telephones. PBX switch 12 serves in routing telephone calls to/from microcell 14 which communicates the calls via CDMA communication signals with the appropriate mobile unit. Microcell 14 includes CDMA controller 18, a plurality of channel units 20A-20N and corresponding vocoders 22A-22N, transceiver 24 and distributed antenna system 26.

PBX switch 12 couples calls to and from a particular available vocoder—channel unit pair. PBX switch 12 is preferably a device which is capable of providing control in transfer of signals therefrom to various vocoders. PBX switch 12 may be a digital device which provides analog or digital voice signal, in addition to digital data signals on a common bus, via well known techniques such as a time multiplexed format, to and from the various vocoders. Voice calls received from PBX switch 12 are digitally encoded, if not previously digitized, by a vocoder of a selected vocoder—channel unit pair, such as vocoder 22A of the vocoder—channel unit pair comprised of vocoder 22A and channel unit 20A. The selected vocoder places the voice in a format which is preferred for CDMA encoding and transmission. Further details on the vocoder is discussed later herein. The channel unit of the selected vocoder—channel unit pair, provides CDMA encoding, and other encoding, of the digitally encoded voice signal to be transmitted to a mobile unit. It should be understood that digitized data may also be transmitted through PBX switch 12 which although are not digitized are formatted for transfer for CDMA encoding and transmission. The vocoder and channel unit are discussed in further detail later herein.

The CDMA encoded signal is output from the respective channel unit to transceiver 24 for frequency conversion to the appropriate transmission frequency and power controlled in transmission. The RF signal is provided to an antenna system 26 which is in the form of a distributed antennas 28A-28I with delay elements 30A-30J disposed between adjacent antennas. Antennas 28A-28I may be generally configured as omnidirectional antennas or directional antennas have a specific pattern. Delay elements 30A-30J may be simple delay lines such as lengths of coaxial cabling, or other well known active or passive delay elements, capable of providing a one microsecond (1 μsec) delay itself or in combination with the interconnection cabling. It should be understood that other means such as optical fibers may be used as the transmission lines between transceiver 24 and antenna system 26. Furthermore, such means may also be used between antenna themselves, and with optical delay devices and proper RF-Optic interfacing with the antennas.

Figure 2:
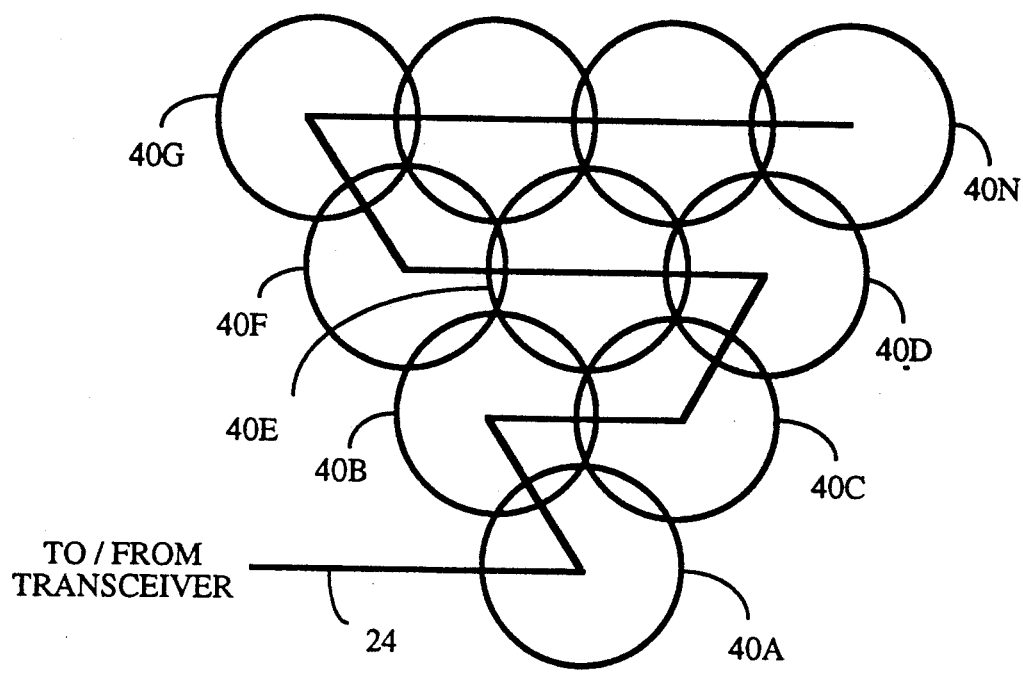
FIG. 2 is an illustration of an exemplary antenna pattern for an distributed antenna system of FIG. 1.

FIG. 2 provides an illustration of an exemplary antenna pattern for a series of antennas configured in accordance with the present invention. The antenna pattern as illustrated in FIG. 2 is generated by a series of omnidirectional antennas each defining a separate antenna pattern 40-40I that is preferably overlapping with the pattern of an adjacent antenna. The overlapping of patterns provides continuous antenna coverage for the desired area. The antennas are coupled in series in an exemplary manner such as indicated by line 42.

It should be understood that the antennas may be designed to be positioned such that their patterns are substantially or completely overlapping in area of coverage. In such an arrangement a delay is provided in the antennal feeds to provide a time diversity in signals. Such an arrangement creates a multipath environment wherein diversity is provided for signal discrimination purposes. This technique is applicable to the microcell environment where additional multipath is desirable. However such a technique is particularly applicable to the CDMA cellular mobile telephone environment where multipath signals are not inherently produced by the terrain. Such is the case in flat open areas where signal reflections, and hence multipath, are at a minimum. Utilization of this technique provides antenna diversity in the cell-to-mobile link with a single antenna.

It should also be understood that various modifications to the antenna system of FIG. 1 may be constructed. For example, it is envisioned that parallel strings of serially connected antennas with a feed from a common source may be utilized. In such an arrangement delay elements would be used as necessary in the feed lines. These delay elements would provide a delay between signals as radiated from the antennas such that the same signal is radiated from a different antenna at a different time.

Figure 3:
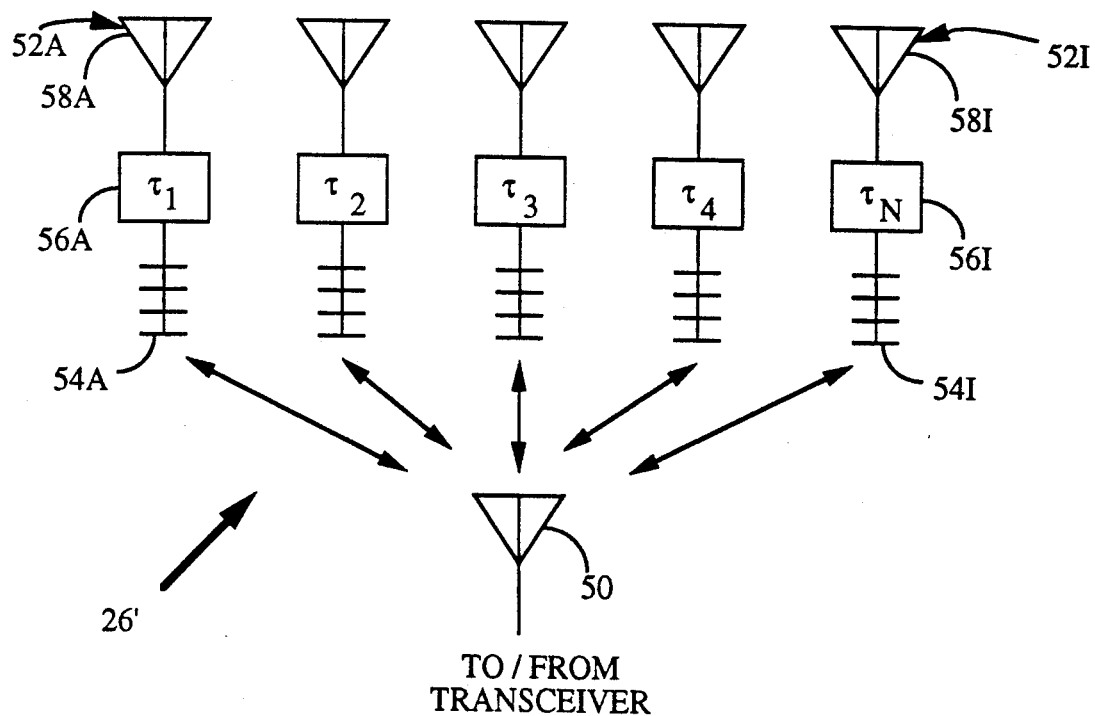
FIG. 3 is a schematic diagram of an alternative distributed antenna system for use with the system of FIG. 1.

FIG. 3 illustrates an alternate embodiment of antenna system 26 for the wireless PBX system of FIG. 1. In FIG. 3 antenna system 26' is comprised of central or local antenna 50 coupled to transceiver 26 in place of antennas 28A-28I and delay elements 30A-30J. A series of remote antenna systems 52A-52I are remotely located from antenna 50. Each of remote antenna systems 52A-52I is comprised of a high gain antenna 54A-54I, delay element 56A-56I, and remote antenna 58A-58I. In this embodiment the distribution of signals within the antenna system is accomplished without the use of cabling.

In antenna system 26' signals from transceiver 24 are radiated by local antenna 50 to each of high gain antennas 54A-54I, typically a directional antenna, where it is amplified as received. The amplified signal is then delayed by a predetermined amount, typically greater than one microsecond, by a corresponding delay element 56A-56I. The delay period of each of delay elements 56A-56I is different from one another typically by a multiple of the one microsecond delay period. The signal is output from each delay element to a corresponding remote antenna 58A-58I where the signal is re-radiated.

Conversely, signals transmitted by a mobile unit are received by one or more of remote antenna 58A-58I where input to a corresponding delay element 56A-56I. Delay element 56A-56I again provide a predetermined delay in the received signal with the delayed signal provided to a corresponding one of high gain antennas 54A-54I. High gain antennas 54A-54I amplify and radiate the signal to local antenna 50.

The antenna system of the present invention is unique to the application microcellular system herein. As mentioned previously, control of signal power is an important aspect of a CDMA telephone system in order to realize increases in user capacity. A conventional omnidirectional antenna radiates a signal roughly equally in all directions. The signal strength is reduced with radial distance from the antenna according to the propagation characteristics of the physical environment. The propagation law may vary from inverse square law to inverse 5.5 power law of the radial distance.

A cell that is designed to serve a certain radius must transmit at a sufficient power level so that a mobile unit at the edge of the cell will receive an adequate signal power level. Mobile units that are closer than the edge of the cell will receive a greater than adequate signal power level. Directional antennas beams can be formed using a variety of techniques known in the art. However, the forming of directional beams cannot alter the propagation law. Coverage of a desired area by a radio signal can be obtained by a combination of antenna pattern, antenna placement and transmitter power.

The use of a distributed antenna system provides the desired antenna pattern, such as coverage of a hallway of a building, where each antenna element provides limited coverage. In providing limited antenna coverage the power necessary to reach a mobile unit within the smaller coverage area is correspondingly reduced since propagation loss is reduced.

However, there is a problem with multiple antennas all radiating the same signal. There will be areas, particularly near points equidistant from two or more of the antennas where the signals may be received from the two antennas that cancel each other. Points where the signal may cancel are separated by approximately one-half wavelength. At 850 MHz this is equal to 17.6 cm or about 7 inches. If two signals arrive at the receive antenna at equal strength but opposite in phase, then they may so cancel. Essentially, this is man-made multipath fading. As with natural multipath fading, diversity is the best method for mitigation of fading. The CDMA system design provides several methods of diversity for mitigation of multipath fading.

The above mentioned copending patent applications disclose a cellular telephone system that uses a CDMA modulation with a 1.25 MHz bandwidth, multiple forms of diversity, and very careful transmitter power control. One method of diversity is the provision of a "rake" receiver architecture in which multiple receivers are provided, each capable of receiving a signal that has traveled a different path and therefore exhibits a different delay. Included is a separate searcher receiver which continuously scans the time domain looking for the best paths and assigning the multiple receivers accordingly.

Another method of diversity is path diversity. In path diversity, the signal is radiated from multiple antennas located in different places, possibly providing more than one propagation path. If two of more antennas can provide acceptable communication paths to the mobile receiver than path diversity fading mitigation can be obtained.

In the microcell system it is desired to provide multiple antennas in order to provide coverage in a desired coverage area but the capacity demand for the system does not require that each antenna be supplied with a separate set of signals as in the conventional cellular system. Instead, to minimize the cost, it is desired to feed some or all of the antennas in the microcell system with the same RF signals. In areas of the microcell system where good paths are possible to two or more of the antennas then path diversity can be obtained.

The problem with feeding the antennas of the microcell system with identically the same signals is that phase cancellation can result in places where near equal signals are received from two or more antennas. What is desired is a simple, low cost way to distinguish the signals feeding the different antennas without adding significantly to the cost of the system. The method for so doing in the present invention is the addition of delay elements in the feeder lines between the base station transceiver and the antennas.

If the multiple antenna system described above is provided with delay lines in the feeders such that each antenna is driven by a signal one or more microseconds delayed from its neighbors, then the multiple receiver architecture of the mobiles will allow the signal from each antenna to be received separately and to be coherently combined in such a way that cancellation will not occur. In fact, fading due to other reflections in the environment can be greatly mitigated by the disclosed technique because a form of path diversity is provided.

A microcell is configured as a standard CDMA cell-site as described in the above mentioned patent applications. In addition to the functions disclosed in these applications, the system includes an antenna system with multiple radiators installed throughout the area to be covered by the microcell. The signals are distributed to the radiators by coaxial cables or other means. A one or more microsecond delay line is included in series with the cable connecting two adjacent antennas.

The mobile units or terminals contain one or more CDMA receivers and a searcher receiver. The searcher scans the time domain determining what paths exist and which are the strongest paths. The available CDMA receivers are then assigned to the strongest available paths. The cell-site receivers contain a similar capability.

In the embodiment as illustrated in FIG. 3, the radiators are not actually connected by cable but, rather, pick up the signal from another radiator using a high gain antenna. The signal picked up, amplified by a small amount, delayed by a predetermined amount, and then re-radiated.

The CDMA system described in the aforementioned disclosures can provide a capacity equal to approximately 40 simultaneous calls in each cell of the system in each 1.25 MHz bandwidth CDMA channel. The resulting cell in the herein disclosed invention is the coverage area of the sum of the antenna patterns of each of the antennas connected by the common feeder system. Thus, the 40 call capacity is available anywhere within the coverage area. As mobile users move about in the system, all callers will continue to receive service no matter how they may congregate within the cell. This is especially useful in wireless PBX systems for businesses such as hotels which contain large ballrooms and other public spaces which could contain a large number of the system users at some times but not at other times during the business day. At other times, the users might all be located in their individual hotel rooms. It is highly desirable for a wireless PBX system to accommodate such situations.

With respect to cellular telephone systems, the Federal Communications Commission (FCC) has allocated a total of 25 MHz for mobile-to-cell links and 25 MHz for cell-to-mobile links. The FCC has divided the allocation equally between two service providers, one of which is the wireline telephone company for the service area and the other chosen by lottery. Because of the order in which allocations were made, the 12.5 MHz allocated to each carrier for each direction of the link is further subdivided into two sub-bands. For the wireline carriers, the sub-bands are each 10 MHz and 2.5 MHz wide. For the non-wireline carriers, the sub-bands are each 11 MHz and 1.5 MHz wide. Thus, a signal bandwidth of less than 1.5 MHz could be fit into any of the sub-bands, while a bandwidth of less than 2.5 MHz could be fit into all but one sub-band. Such a frequency scheme is also applicable to the microcellular system, however other frequency plans may be available and more desirable in certain instances.

To preserve maximum flexibility in allocating the CDMA technique to the available cellular frequency spectrum such as used in a cellular telephone system, the waveform should be less than 1.5 MHz in bandwidth. A good second choice would be a bandwidth of about 2.5 MHz, allowing full flexibility to the wireline cellular carriers and nearly full flexibility to non-wireline cellular carriers. While using a wider bandwidth has the advantage of offering increased multipath discrimination, disadvantages exist in the form of higher equipment costs and lower flexibility in frequency assignment within the allocated bandwidth.

In a spread spectrum wireless PBX or local loop telephone system, such as disclosed herein, the preferred waveform design involves a direct sequence pseudonoise spread spectrum carrier as in the cellular telephone system as disclosed in the previously mentioned copending patent application and U.S. Pat. No. 4,901,307. The chip rate of the PN sequence is chosen to be 1.2288 MHz such that the resulting bandwidth, about 1.25 MHz after filtering, is approximately one-tenth of the total bandwidth allocated to one cellular service carrier.

Another consideration in the choice of the exact chip rate is that it is desirable that the chip rate be exactly divisible by the baseband data rates to be used in the system. It is also desirable for the divisor to be a power of two. With a baseband data rate of 9600 bits per second, the PN chip rate is chosen to be 1.2288 MHz, i.e. 128 times 9600.

In the microcell-to-mobile link, the binary sequences used for spreading the spectrum are constructed from two different types of sequences, each with different properties to provide different functions. An outer code is shared by all signals in a microcell to provided discrimination between multipath signals. The outer code may also used to discriminate between signals transmitted to the mobile units by different microcells, should additional microcells exist in the system. There is also an inner code that is used to discriminate between user signals transmitted by single sector or cell.

The carrier waveform design in the preferred embodiment for the microcell transmitted signals utilizes a sinusoidal carrier that is quadraphase (four phase) modulated by a pair of binary PN sequences that provide the outer code transmitted by a single sector or cell. The sequences are generated by two different PN generators of the same sequence length. One sequence bi-phase modulates the in-phase channel (I Channel) of the carrier and the other sequence bi-phase modulates the quadrature phase (Q Channel) of the carrier. The resulting signals are summed to form a composite four-phase carrier.

Although the values of a logical "zero" and a logical "one" are conventionally used to represent the binary sequences, the signal voltages used in the modulation process are $+V$ volts for a logical "one" and $-V$ volts for a logical "zero". To bi-phase modulate a sinusoidal signal, a zero volt average value sinusoid is multiplied by the $+V$ or $-V$ voltage level as controlled by the binary sequences using a multiplier circuit. The resulting signal may then be band limited by passing through a bandpass filter. It is also known in the art to lowpass filter the binary sequence stream prior to multiplying by the sinusoidal signal, thereby interchanging the order of the operations. A quadraphase modulator consists of two bi-phase modulators each driven by a different sequence and with the sinusoidal signals used in the bi-phase modulators having a 90° phase shift therebetween.

In such an embodiment, the sequence length for the transmitted signal carrier is chosen to be 32768 chips. Sequences of this length can be generated by a modified maximal length linear sequence generator by adding a zero bit to a length 32767 chip sequence. The resulting sequence has good cross-correlation and autocorrelation properties.

A sequence this short in length is desirable in order to minimize acquisition time of the mobile units when they first enter the system without knowledge of system timing. With unknown timing, the entire length of the sequence must be searched to determine the correct timing. The longer the sequence, the longer time the acquisition search will require. Although sequences shorter than 32768 could be used, it must be understood that as sequence length is reduced, the code processing gain is reduced. As processing gain is reduced, the rejection of multipath interference along with interference from adjacent cells and other sources will also be reduced, perhaps to unacceptable levels. Thus, there is a desire to use the longest sequence that can be acquired in a reasonable time. It is also desirable to use the same code polynomials in all cells so that the mobile unit, not knowing what cell it is in when initially acquiring synchronization, can obtain full synchronization by searching a single code polynomial.

All signals transmitted by a microcell share the same outer PN codes for the I and Q channels. The signals are also spread with an inner orthogonal code generated by using Walsh functions. A signal addressed to a particular user is multiplied by the outer PN sequences and by a particular Walsh sequence, or sequence of Walsh sequences, assigned by the system controller for the duration of the user's telephone call. The same inner code is applied to both the I and Q channels resulting in a modulation which is effectively bi-phase for the inner code.

It is well known in the art that a set of n orthogonal binary sequences, each of length n, for n any power of 2 can be constructed, see *Digital Communications with Space Applications*, S. W. Golomb et al., Prentice-Hall, Inc, 1964, pp. 45-64. In fact, orthogonal binary sequence sets are also known for most lengths which are multiples of four and less than two hundred. One class of such sequences that is easy to generate is called the Walsh function, also known as Hadamard matrices. A Walsh sequence is one of the rows of a Walsh function matrix. A Walsh function of order n contains n sequences, each of length n bits.

A Walsh function of order n (as well as other orthogonal functions) has the property that over the interval of n code symbols, the cross-correlation between all the different sequences within the set is zero, provided that the sequences are time aligned with each other. This can be seen by noting that every sequence differs from every other sequence in exactly half of its bits. It should also be noted that there is always one sequence containing all zeroes and that all the other sequences contain half ones and half zeroes.

Since all the signals transmitted by a microcell are orthogonal to each other they do not contribute interference to each other. This eliminates the majority of the interference in most locations, allowing a higher capacity to be obtained.

As an added feature, the system may further use a voice channel which is a variable rate channel whose data rate can be varied from data block to data block with a minimum of overhead required to control the data rate in use. The use of variable data rates reduces mutual interference by eliminating unnecessary transmissions when there is no useful speech to be transmitted. Algorithms are utilized within the vocoders for generating a varying number of bits in each vocoder block in accordance with variations in speech activity. During active speech, the vocoder may produce 20 msec. data blocks containing 20, 40, 80, or 160 bits, depending on the activity of the speaker. It is desired to transmit the data blocks in a fixed amount of time by varying the rate of transmission. It is further desirable not to require signalling bits to inform the receiver how many bits are being transmitted.

The blocks are further encoded by the use of a cyclic redundancy check code (CRCC) which appends to the block an additional set of parity bits which can be used to determine whether or not the block of data has been decoded correctly. CRCC check codes are produced by dividing the data block by a predetermined binary polynomial. The CRCC consists of all or a portion of the remainder bits of the division process. The CRCC is checked in the receiver by reproducing the same remainder and checking to see of the received remainder bits are the same as the regenerated check bits.

In the disclosed invention, the receiving decoder decodes the block as if it contains 160 bits, and then again as if it contains 80 bits, etc. until all possible block lengths have been tried. The CRCC is computed for each trial decoding. If one of the trial decodings results in a correct CRCC, the data block is accepted and passed on to the vocoder for further processing. If no trial decoding produces a valid CRCC, the received symbols are passed on to the system's signal processor where other processing operations can optionally be performed.

In the microcell transmitter, the power of the transmitted waveform is varied as the data rate of the block is varied. The highest data rate uses the highest carrier power. When the data rate is lower than the maximum, the modulator, in addition to lowering the power, repeats each encoded data symbol a number of times as required to achieve the desired transmission rate. For example, at the lowest transmission rate, each encoded symbol is repeated four times.

In the mobile transmitter, the peak power is held constant but the transmitter is gated off ½, or ¼ or ⅛ of the time in accordance with the number of bits to be transmitted in the data block. The positions of the on-times of the transmitter is varied pseudo-randomly in accordance with the mobile user's addressed user code.

As disclosed in copending application Ser. No. 07/543,496 for the Cell-to-Mobile Link, i.e. Microcell-to-Mobile Link as used in the context herein, the Walsh function size n, is set equal to sixty-four (n=64) for the cell-to-mobile link. Therefore each of up to sixty-four different signals to be transmitted are assigned a unique orthogonal sequence. The forward error correction (FEC) encoded symbol stream for each voice conversation is multiplied by its assigned Walsh sequence. The Walsh coded/FEC encoded symbol stream for each voice channel is then multiplied by the outer PN coded waveform. The resultant spread symbol streams are then added together to form a composite waveform.

The resulting composite waveform is then modulated onto a sinusoidal carrier, bandpass filtered, translated to the desired operating frequency, amplified and radiated by the antenna system. Alternate embodiments of the present invention may interchange the order of some of the just described operations for forming the cell-site transmitted signal. For example, it may be preferred to multiply each voice channel by the outer PN coded waveform and perform the filtering operation prior to summation of all the channel signals to be radiated by the antenna. It is well known in the art that the order of linear operations may be interchanged to obtained various implementation advantages and different designs.

The waveform design for the wireless PBX service uses the pilot carrier approach for the microcell-to-mobile link as described in U.S. Pat. No. 4,901,307. The pilot waveform uses the all-zero Walsh sequence, i.e. a Walsh sequence comprised of all zeroes that is found in all Walsh function sets. The use of the all-zero Walsh sequence for all cells' pilot carriers allows the initial search for the pilot waveform to ignore the Walsh functions until after the outer code PN synchronization has been obtained. The Walsh framing is locked to the PN code cycle by virtue of the length of the Walsh frame being a factor of the PN sequence length. Therefore, provided that the cell addressing offsets of the PN code are multiples of sixty-four chips (or the Walsh frame length) then the Walsh framing is known implicitly from the outer PN code timing cycle.

The pilot carrier is transmitted at a higher power level than a typical voice carrier so as to provide greater signal to noise and interference margin for this signal. The higher power level pilot carrier enables the initial acquisition search to be done at high speed and to make possible a very accurate tracking of the carrier phase of the pilot carrier by a relatively wide bandwidth phase tracking circuit. The carrier phase obtained from tracking the pilot carrier is used as the carrier phase reference for demodulation of the carriers modulated by user information signals. This technique allows many user carriers to share the common pilot signal for carrier phase reference. For example, in a system transmitting a total of fifteen simultaneous voice carriers, the pilot carrier might be allocated a transmit power equal to four voice carriers.

In addition to the pilot carrier, another carrier intended to be received by all system users in the microcell is transmitted by the microcell. This carrier, called the synchronization channel, also uses the same 32768 length PN sequence for spectrum spreading but with a different, pre-assigned Walsh sequence. The synchronization channel transmits a broadcast message containing system information for use by the mobiles in the system. The system information identifies the cell-site and the system and conveys information allowing the long PN codes used for mobile information signals to be synchronized without additional searching. Another channel, called the paging channel may be provided to transmit messages to mobile units indicating that a call has arrived for them, and to respond with channel assignments when a mobile unit initiates a call.

Each voice carrier transmits a digital representation of the speech for a telephone call. The analog speech waveform is digitized using standard digital telephone techniques and then compressed using a vocoding process to a data rate of approximately 9600 bits per second. This data signal is then rate $r=\frac{1}{3}$, constraint length $K=9$ convolutional encoded, with repetition, and interleaved in order to provide error detection and correction functions which allow the system to operate at a much lower signal-to-noise and interference ratio. Techniques for convolutional encoding, repetition and interleaving are well known in the art.

The resulting encoded symbols are multiplied by an assigned Walsh sequence and then multiplied by the outer PN code. This process results in a PN sequence rate of 1.2288 MHz or 128 times the 9600 bps data rate. The resulting signal is then modulated onto an RF carrier and summed with the pilot and setup carriers, along with the other voice carriers. Summation may be accomplished at several different points in the processing such as at the IF frequency, or at the baseband frequency either before or after multiplication by the PN sequence.

Each voice carrier is also multiplied by a value that sets its transmitted power relative to the power of the other voice carriers. This power control feature allows power to be allocated to those links that require higher power due to the intended recipient being in a relatively unfavoring location. Means are provided for the mobiles to report their received signal-to-noise ratio to allow the power to be set at a level so as to provide adequate performance without waste. The orthogonality property of the Walsh functions is not disturbed by using different power levels for the different voice carriers provided that time alignment is maintained.

Figure 4:
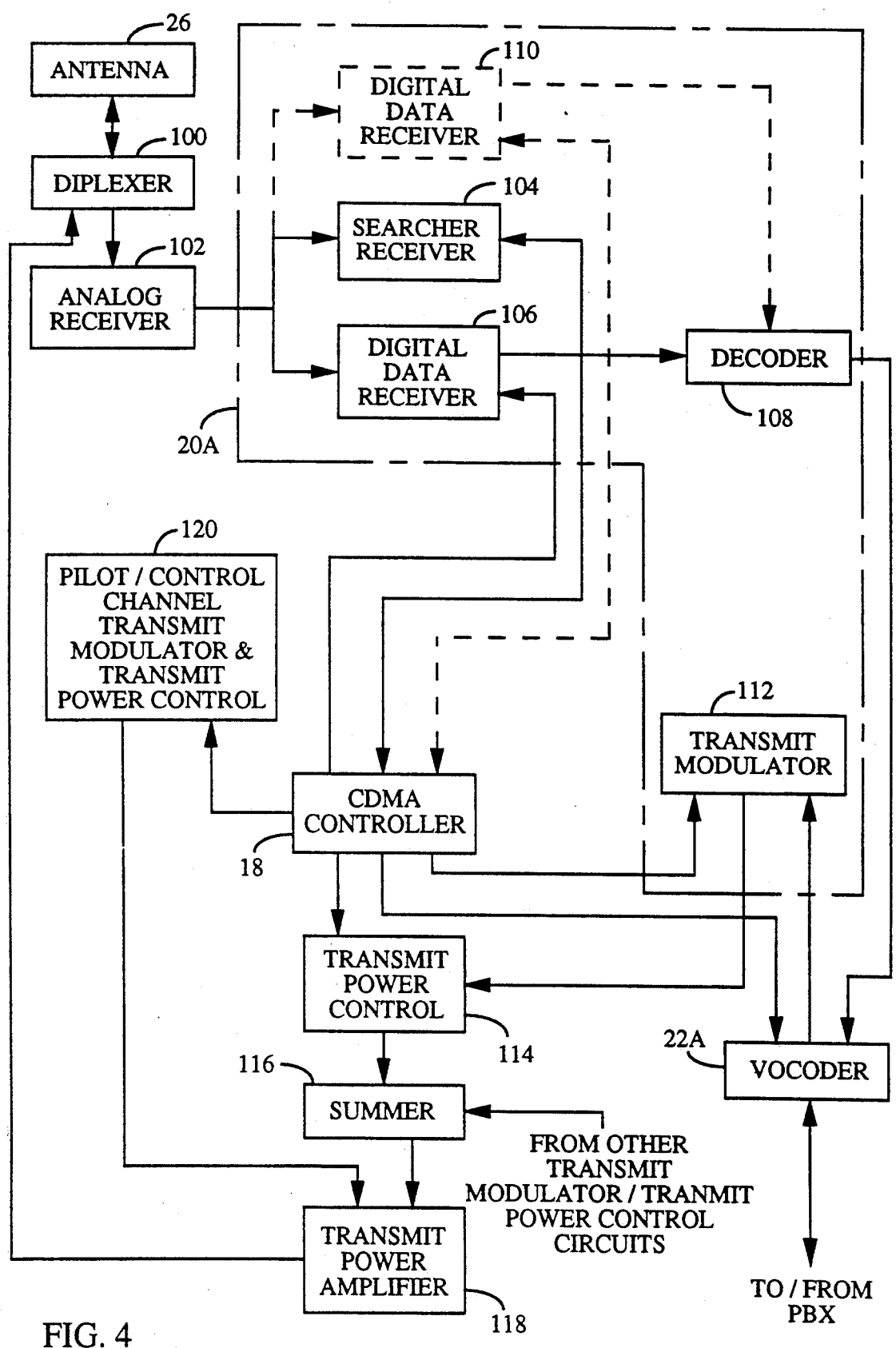
FIG. 4 is a block diagram of the exemplary microcell equipment as implemented in a CDMA wireless PBX telephone system.

FIG. 4 illustrates in block diagram form the exemplary embodiment microcell equipment of FIG. 1. Common to both of the receiver and transceiver portions of transceiver 24 is diplexer 100. In FIG. 4, the receiver system of transceiver 24 of microcell 14 is comprised of analog receiver 102, while the corresponding components of the channel unit, here channel unit 20A, is comprised of searcher receiver 104, digital data receiver 106 and decoder circuitry 108. The receiver system may also include an optional digital data receiver receiver 110. Further details of an exemplary embodiment of analog receiver 100 are provided in copending application Ser. No. 07/543,496.

Microcell 14, as mentioned previously, includes CDMA controller 18 which is coupled to data receivers 106 and 110 along with searcher receiver 104. CDMA controller 18 provides among other functions, as Walsh sequence and code assignment, signal processing, timing signal generation, power control and various other related functions.

Signals received on antenna 26 are provided via diplexer 100 to analog receiver 102 and then to searcher receiver 104. Searcher receiver 104 is used to at the microcell to scan the time domain about the received signal to ensure that digital data receiver 106 is tracking and processing the strongest available time domain signal. Searcher receiver 104 provides a signal to CDMA controller 18 which provides control signals to digital data receiver 106 for selecting the appropriate received signal for processing.

The signal processing in the microcell data receiver and searcher receiver is different in several aspects than the signal processing by similar elements in the mobile unit. In the inbound, i.e. reverse or mobile-to-microcell link, the mobile unit does not transmit a pilot signal that can be used for coherent reference purposes in signal processing at the cell-site. The mobile-to-microcell link is characterized by a non-coherent modulation and demodulation scheme using 64-ary orthogonal signalling.

In the 64-ary orthogonal signalling process, the mobile unit transmitted symbols are encoded into one of $2^6$, i.e. 64, different binary sequences. The set of sequences chosen are known as Walsh functions. The optimum receive function for the Walsh function m-ary signal encoding is the Fast Hadamard Transform (FHT).

Referring again to FIG. 2, searcher receiver 104 and digital data receiver 106 receive the signals output from analog receiver 102. In order to decode the spread spectrum signals transmitted to the particular cell-site receiver through which the mobile unit communicates, the proper PN sequences must be generated. Further details on the generation of the mobile unit signals are in copending application Ser. No. 07/543,496.

The Viterbi decoder contained within circuitry 108 is of a type capable of decoding data encoded at the mobile unit with a constraint length $K=9$, and of a code rate $r=\frac{1}{3}$. The Viterbi decoder is utilized to determine the most likely information bit sequence. Periodically, nominally 1.25 msec, a signal quality estimate is obtained and transmitted as a mobile unit power adjustment command along with data to the mobile unit. This quality estimate is the average signal-to-noise ratio over the 1.25 msec interval.

Each data receiver tracks the timing of the received signal it is receiving. This is accomplished by the well known technique of correlating the received signal by a slightly early local reference PN and correlating the received signal with a slightly late local reference PN. The difference between these two correlations will average to zero if there is no timing error. Conversely, if there is a timing error, then this difference will indicate the magnitude and sign of the error and the receiver's timing is adjusted accordingly.

Signals from the PBX are coupled to the appropriate transmit modulator vocoder 22A-22N under control of CDMA controller 18. For the example illustrated in FIG. 4, vocoder 22A is used. Channel unit 20A further comprises transmit modulator 112 which under control of CDMA controller 18 spread spectrum modulates the data for transmission to the intended recipient mobile unit.

The output of transmit modulator 112 is provided to transmit power control circuitry 114 where under the control of CDMA controller 18 the transmission power may be controlled. The output of circuitry 114 is provided to summer 116 where it is summed with the output of transmit modulator/transmit power control circuits of other channel units. Summer may be grouped with one of the channel units or considered as part of the transmitter portion of transceiver 24. The output of summer 116 is provided to the transmitter portion of transceiver 24 which is comprised of transmit power amplifier circuitry 118. Transmit power amplifier circuitry 118 amplifies the signal for output via diplexer 100 to antenna 26 for radiating to the mobile units within the microcell service area. Further details on exemplary transmitter circuitry of FIG. 4 are illustrated in copending application Ser. No. 07/543,496.

FIG. 4 further illustrates pilot/control channel generators and transmit power control circuitry 120 which may be contained with one of the channel units or as a separate component of the system. Circuitry 120 under control of CDMA controller 18 generates and power controls the pilot signal, the sync channel, and the paging channel for coupling to transmit power amplifier circuitry 118 for output via diplexer 100 to antenna 26.

In the preferred embodiment, Walsh function encoding of the channel signals is employed as the inner code. In the exemplary numerology as disclosed herein, a total of 64 different Walsh sequences are available with three of these sequences dedicated to the pilot, sync and paging channel functions. In the sync, paging and voice channels, input data is convolutionally encoded and then interleaved as is well known in the art. Furthermore, the convolutional encoded data is also provided with repetition before interleaving as is also well known in the art.

The pilot channel contains no data modulation and is characterized as an unmodulated spread spectrum signal that all of the users of a particular cell-site or sector use for acquisition or tracking purposes. Each cell, or if divided into sectors, each sector has a unique pilot signal. However, rather than using different PN generators for the pilot signals, it is realized that a more efficient way to generate different pilot signals is to use shifts in the same basic sequence. Utilizing this technique a mobile unit sequentially searches the whole sequence and tunes to the offset or shift that produces the strongest correlation. In using this shift of the basic sequence, the shifts must be such that the pilots in adjacent cells or sectors must not interfere or cancel.

The pilot sequence must therefore be long enough that many different sequences can be generated by shifts in the basic sequence to support a large number of pilot signals in the system. Furthermore, the separation or shifts must be great enough to ensure that there is no interference in pilot signals. Accordingly, in a exemplary embodiment of the present invention the pilot sequence length is chosen to be $2^{15}$. The sequence is generated started by a sequence $2^{15}-1$ with an extra 0 appended to the sequence when a particular state is detected. In the exemplary embodiment there are chosen to be 512 different pilot signals with offsets in the basic sequence of 64 chips. However, offsets may be integer multiples of the 64 chip offset with a corresponding reduction in the number of different pilot signals.

In generating the pilot signal, the Walsh "zero" ($W_0$) sequence which consists of all zeroes is used so as to not modulate the pilot signal, which in essence is the $PN_I$ and $PN_Q$ sequences. The Walsh "zero" ($W_0$) sequence is therefore multiplied by the $PN_I$ and $PN_Q$ sequences in exclusive-OR gates. The resulting pilot signal thus contains only the $PN_I$ and $PN_Q$ sequences. With all cell-sites and sectors having the same PN sequence for the pilot signal, the distinguishing feature between cell-sites or sectors of origination of the transmission is the phase of the sequence.

The sync channel information is encoded and then multiplied in exclusive-OR gates by a preassigned Walsh sequence. In the exemplary embodiment, the selected Walsh function is the ($W_{32}$) sequence which consists of a sequence of 32 "ones" followed by 32 "zeros". The resulting sequence is then multiplied by the $PN_I$ and $PN_Q$ sequences in exclusive-OR gates.

In an exemplary embodiment the sync channel data information is provided to the transmit modulator typically at a rate of 1200 bps. In the exemplary embodiment the sync channel data is preferably convolutionally encoded at a rate $r=\frac{1}{2}$ with a constraint length $K=9$, with each code symbol repeated twice. This encoding rate and constraint length is common to all encoded forward link channels, i.e. sync, paging and voice. In an exemplary embodiment, a shift register structure is employed for the generators of the code $G_1=753$ (octal) and $G_2=561$ (octal). The symbol rate to the sync channel is in the exemplary embodiment 4800 sps, i.e. one symbol is 208 $\mu$sec or 256 PN chips.

The code symbols are interleaved by means of a convolutional interleaver spanning in the exemplary embodiment 40 msec. The tentative parameters of the interleaver are $I=16$ and $J=48$. Further details on interleaving is found in *Data Communication, Networks and Systems*, Howard W. Sams & Co., 1987, pp. 343-352. The effect of the convolutional interleaver is to disperse unreliable channel symbols such that any two symbols in a contiguous sequence of $I-1$ or fewer symbols are separated by at least $J+1$ symbols in a deinterleaver output. Equivalently, any two symbols in a contiguous sequence of $J-1$ symbols are separated by at least $I+1$ symbols at the deinterleaver output. In other words, if $I=16$ and $J=48$, in a string of 15 symbols, the symbols are transmitted separated by 885 $\mu$sec, thus providing time diversity.

The sync channel symbols of the microcell are tied to the pilot signal for the microcell. The pilot signal cycle in the exemplary embodiment is 26.67 msec long, which corresponds to 128 sync channel code symbols or 32 sync channel information bits. The sync channel symbols are interleaved by a convolutional interleaver which spans 26.67 msec. Thus, when the mobile unit has acquired the pilot signal, it has immediate sync channel interleaver synchronization.

The sync channel symbols are covered by the preassigned Walsh sequence to provide orthogonality in the signal. In the sync channel, one code symbol spans four cover sequences, i.e. one code symbol to four repetitions of the "32 one"-"32 zero" sequence, as illustrated in FIG. 6. A single logical "one" represents the occurrence of 32 "one" Walsh chips while a single logical "zero" represents the occurrence of 32 "zero" Walsh chips. Orthogonality in the sync channel is still maintained even though the sync channel symbols are skewed with respect to absolute time depending upon the associated pilot channel because sync channel shifts are integer multiples of the Walsh frame.

The sync channel messages in the exemplary embodiment are variable in length. The length of the message is an integer multiple of 80 msec which corresponds to 3 pilot cycles. Included with the sync channel information bits are cyclic redundancy (CRC) bits for error detection.

As soon as a sync channel message has been correctly received, the mobile unit has the ability to immediately synchronize to either a paging channel or a voice channel. At pilot sync, corresponding to the end of each sync message, a new 40 msec interleaver cycle begins. At that time, the mobile unit starts deinterleaving the first code symbol of either a code repetition, or a ($c_x$, $c_{x+1}$) pair, with decoder synchronization achieved. The deinterleaver write address is initialized to 0 and the read address is initialized to J, such that memory deinterleaver synchronization is achieved.

The sync channel messages carry information regarding the state of a 42-bit long PN generator for the voice channel assigned for the communication with the mobile unit. This information is used at the mobile unit digital data receivers to synchronize the corresponding PN generators.

The paging channel information is also encoded with repetition, interleaved and then multiplied by a preassigned Walsh sequence. The resulting sequence is then multiplied by the $PN_I$ and $PN_Q$ sequences. The data rate of the paging channel for a particular sector or cell is indicated in an assigned field in the sync channel message. Although the paging channel data rate is variable, it is in the exemplary embodiment fixed for each system at one of the following exemplary data rates: 9.6, 4.8, 2.4 and 1.2 kbps.

The data of each voice channel is also encoded with repetition, interleaved, scrambled, multiplied by its assigned Walsh sequence ($W_i$-$W_j$), and then multiplied by the $PN_I$ and $PN_Q$ sequences. The Walsh sequence to be used by a particular channel is assigned by the system controller at call setup time in the same manner as channels are assigned to calls in the analog FM cellular system. In the exemplary embodiment illustrated herein, up to 61 different Walsh sequences are available for use by the voice channels.

In the exemplary embodiment of the present invention, the voice channel utilizes a variable data rate. The intent in using a variable data rate is to lower the data rate when there is no voice activity thereby reducing interference generated by this particular voice channel to other users. The vocoder envisioned to provide variable rate data is disclosed in copending U.S. patent application "VARIABLE RATE VOCODER" Ser. No. 07/713,661, filed Jun. 11, 1991, also assigned to the assignee of the present invention. Such a vocoder produces data at four different data rates based on voice activity on a 20 msec frame basis. Exemplary data rates are 9.6 kbps, 4.8 kbps, 2.4 kbps and 1.2 kbps. Although the data rate will vary on a 20 msec basis, the code symbol rate is kept constant by code repetition at 19.2 ksps. Accordingly, the code symbols are repeated 2, 4 and 8 times for the respective data rates 4.8 kbps, 2.4 kbps and 1.2 kbps.

Since the variable rate scheme is devised to reduce interference, the code symbols at the lower rates will have lower energy. For example, for the exemplary data rates of 9.6 kbps, 4.8 kbps, 2.4 kbps and 1.2 kbps, the code symbol energy ($E_s$) is respectively $E_b/2$, $E_b/4$, $E_b/8$ and $E_b/16$ where $E_b$ is the information bit energy for the 9.6 kbps transmission rate.

The code symbols are interleaved by a convolutional interleaver such that code symbols with different energy levels will be scrambled by the operation of the interleaver. In order to keep track of what energy level a code symbol should have a label is attached to each symbol specifying its data rate for scaling purposes. After orthogonal Walsh covering and PN spreading, the quadrature channels are digitally filtered by a Finite Impulse Response (FIR) filter. The FIR filter will receive a signal corresponding to the symbol energy level in order to accomplish energy scaling according to the data rate. The I and Q channels will be scaled by factors of: $1, 1/\sqrt{2}, \frac{1}{2}$, or $\frac{1}{4}\sqrt{2}$. In one implementation the vocoder would provide a data rate label in the form of a 2-bit number to the FIR filter for controlling the filter scaling coefficient.

In the exemplary embodiment, each voice channel signal is scrambled to provide greater security in cell-to-mobile transmissions. Although such scrambling is not required it does enhance the security in communications. For example, scrambling of the voice channel signals may be accomplished by PN coding the voice channel signals with a PN code determined by the mobile unit address of user ID. Such scrambling may use the $PN_U$ sequence or encryption scheme as discussed with reference to FIG. 3 with respect to the particular receiver for the mobile-to-cell communications. Accordingly, a separate PN generator may be implemented for this function. Although scrambling is discussed with reference to a PN sequence, scrambling may be accomplished by other techniques including those well known in the art.

In addition to voice bits, the forward link voice channel carries power control information. The power control bit rate is in the exemplary embodiment 800 bps. The cell-site receiver which is demodulating the mobile-to-microcell signal from a given mobile, generates the power control information which is inserted in the cell-to-mobile voice channel addressed to that particular mobile. Further details on the power control feature is disclosed in the above identified copending application.

Power control bits are inserted at the output of the convolutional interleaver by means of a technique called code symbol puncturing. In other words, whenever a power control bit needs to be transmitted two code symbols are replaced by two identical code symbols with polarity given by the power control information. Moreover, power control bits are transmitted at the energy level corresponding to the 9600 bps bit rate.

An additional constraint imposed on the power control information stream is that the position of the bits must be randomized among mobile-to-cell channels. Otherwise the full energy power control bits would generate spikes of interference at regular intervals, thus diminishing the detectability of such bits.

The characteristic of interest in the Walsh function is that each of the 64 sequences is perfectly orthogonal to all of the other sequences. As such, any pair of sequences differ in exactly as many bit positions as they agree, i.e. 32 over an interval of 64 symbols. Thus when information is encoded for transmission by the Walsh sequences the receiver will be able to select any one of the Walsh sequences as a desired "carrier" signal. Any signal energy encoded onto the other Walsh sequences will be rejected and not result in mutual interference to the desired one Walsh sequence.

In the exemplary embodiment for the cell-to-mobile link, the sync, paging and voice channels as mentioned previously use convolutional encoding of a constraint length $K=9$ and code rate $r=\frac{1}{2}$, that is, two encoded symbols are produced and transmitted for every information bit to be transmitted. In addition to the convolutional encoding, convolutional interleaving of symbol data is further employed. It is further envisioned that repetition is also utilized in conjunction with the convolutional encoding. At the mobile unit the optimum decoder for this type of code is the soft decision Viterbi algorithm decoder. A standard design can be used for decoding purposes. The resulting decoded information bits are passed to the mobile unit digital baseband equipment.

CDMA controller 18 has the responsibility for assignment of channel units and vocoders to a particular call.

CDMA controller 18 also monitors the progress of the call, quality of the signals and initiates teardown on loss of signal.

In the mobile-to-microcell link, the channel characteristics dictate that the modulation technique be modified. In particular, the use of a pilot carrier as is used in the cell-to-mobile link is no longer feasible. The pilot carrier must be more powerful than a voice carrier in order to provide a good phase reference for data modulation. With the microcell transmitting many simultaneous voice carriers, a single pilot signal can be shared by all the voice carriers. Therefore, the pilot signal power per voice carrier is quite small.

In the mobile-to-microcell link, however, there is usually only a single voice carrier per mobile. If a pilot were used, it would require significantly more power than the voice carrier. This situation is clearly not desirable since overall system capacity would be greatly reduced due to the interference caused by the presence of a larger number of high power pilot signals. Therefore, a modulation capable of efficient demodulation without a pilot signal must be used.

Thus, a form of orthogonal signaling such as binary, quaternary or m-ary signalling should be employed. In the exemplary embodiment, a 64-ary orthogonal signaling technique is employed using Walsh functions. The demodulator for m-ary orthogonal signaling requires channel coherence only over the duration of transmission of the m-ary symbol. In the exemplary embodiment, this is only two bit times.

The mobile unit transmitted signals are direct sequence spread spectrum signals that are modulated by a PN sequence clocked at a predetermined rate, which in the preferred embodiment is 1.2288 MHz. This clock rate is chosen to be an integer multiple of the baseband data rate of 9.6 Kbps.

The message encoding and modulation process begins with a convolutional encoder of constraint length $K=9$ and code rate $r=\frac{1}{3}$. At a nominal data rate of 9600 bits per second, the encoder produces 28800 binary symbols per second. These are grouped into characters containing 6 symbols each at a rate of 4800 characters per second with there being 64 possible characters. Each character is encoded into a length 64 Walsh sequence containing 64 binary bits or "chips." The 64-ary Walsh chip rate is 307,200 chips per second in the exemplary embodiment.

The Walsh chips are then "covered" or multiplied by a PN sequence running at the rate of 1.2288 MHz. Each mobile unit is assigned a unique PN sequence for this purpose. This PN sequence can either be assigned only for the duration of the call or assigned permanently to the mobile unit. The assigned PN sequence is referred to herein as the user PN sequence. The user PN sequence generator runs at a clock rate of 1.2288 MHz and so as to produce four PN chips for every Walsh chip.

Finally, a pair of short, length 32768, PN sequences are generated. In the exemplary embodiment, the same sequences are used as for the cell-to-mobile link. The user PN sequence covered Walsh chip sequence is then covered or multiplied by each of the two short PN sequences. The two resulting sequences then bi-phase modulate a quadrature pair of sinusoids and are summed into a single signal. The resulting signal is then bandpass filtered, translated to the final RF frequency, amplified, filtered and radiated by the antenna of the mobile unit. As was discussed with reference to the cell-to-mobile signal, the ordering of the filtering, amplification, translation and modulation operations may be interchanged.

In an alternative embodiment, two different phases of the user PN code might be produced and used to modulate the two carrier phases of the quadraphase waveform, dispensing with the need for using the length 32768 sequences. In yet another alternative, the mobile-to-cell link might utilize only bi-phase modulation, also dispensing with the need for the short sequences.

The microcell receiver for each signal produces the short PN sequences and the user PN sequence for each active mobile signal being received. The receiver correlates the received signal energy with each of the coded waveforms in separate correlators. Each of the correlator outputs is then separately processed to demodulate the 64-ary encoding and the convolutional coding using a Fast Hadamard Transform processor and a Viterbi algorithm decoder.

Figure 5:
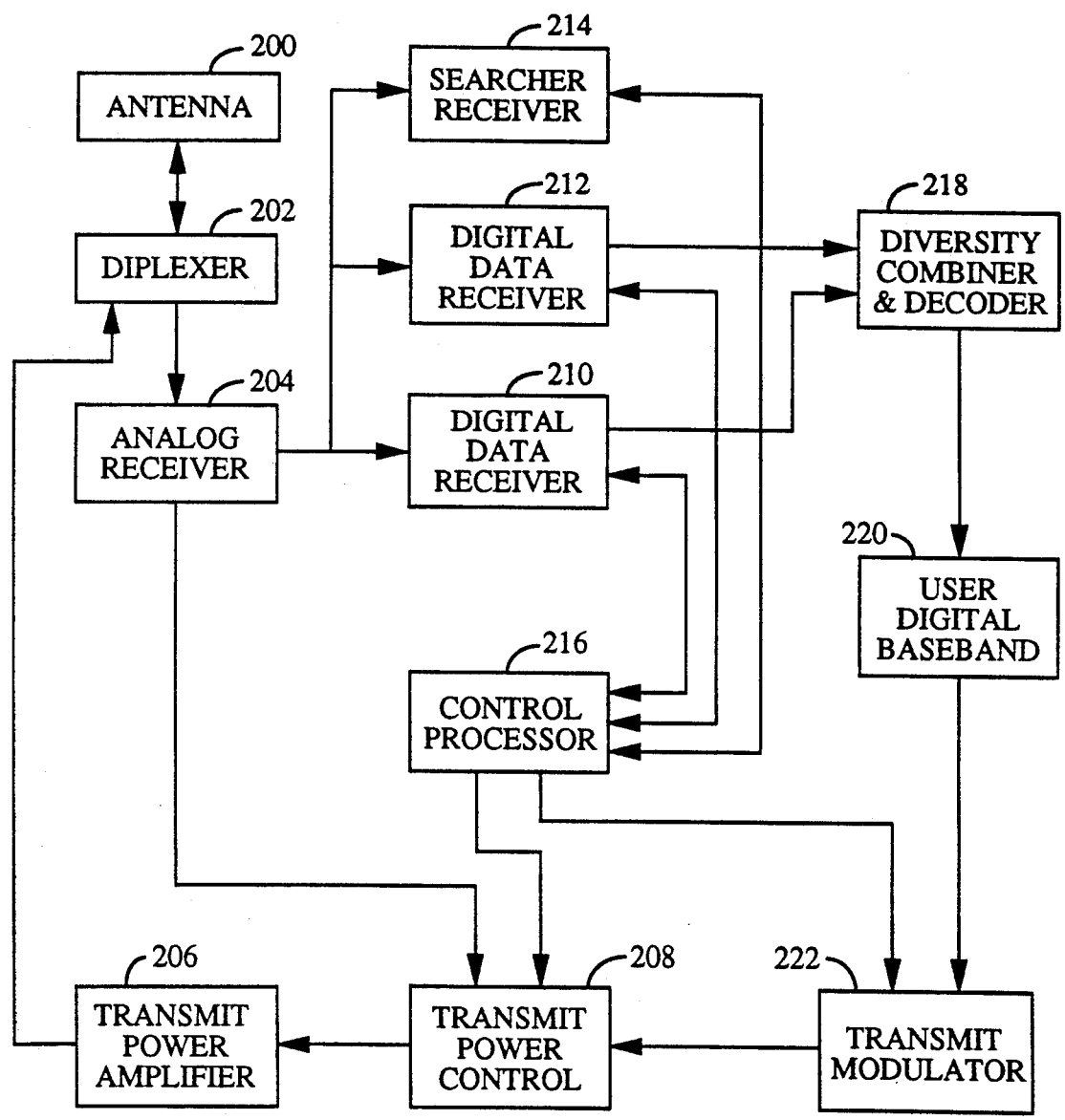
FIG. 5 is a block diagram of the mobile unit telephone configured for CDMA communications in the CDMA wireless PBX telephone system.

FIG. 5 illustrates in block diagram form an exemplary mobile unit CDMA telephone set. The mobile unit CDMA telephone set includes an antenna 200 which is coupled through diplexer 202 to analog receiver 204 and transmit power amplifier 206. Antenna 200 and diplexer 202 are of standard design and permit simultaneous transmission and reception through a single antenna. Antenna 200 collects transmitted signals and provides them through diplexer 202 to analog receiver 204.

Receiver 204 receives the RF frequency signals from diplexer 202 which are typically in the 850 MHz frequency band for amplification and frequency downconversion to an IF frequency. This translation process is accomplished using a frequency synthesizer of standard design which permits the receiver to be tuned to any of the frequencies within the receive frequency band of the overall cellular telephone frequency band. The signals are also filtered and digitized for providing to digital data receivers 210 and 212 along with searcher receiver 214. Further details of an exemplary embodiment of receivers 204, 210, 212 and 214 are illustrated in copending application Ser. No. 07/543,496.

Receiver 204 also performs a power control function for adjusting the transmit power of the mobile unit. Receiver 204 generates an analog power control signal that is provided to transmit power control circuitry 208.

In FIG. 5, the digitized signal output from receiver 204 is provided to digital data receivers 210 and 212 and to searcher receiver 214. It should be understood that an inexpensive, low performance mobile unit might have only a single data receiver while higher performance units may have two or more to allow diversity reception.

The digitized IF signal may contain the signals of many on-going calls together with the pilot carriers transmitted by the current cell-site and all neighboring cell-sites. The function of the receivers 210 and 212 are to correlate the IF samples with the proper PN sequence. This correlation process provides a property that is well-known in the art as "processing gain" which enhances the signal-to-interference ratio of a signal matching the proper PN sequence while not enhancing other signals. Correlation output is then synchronously detected using the pilot carrier from the closest cell-site as a carrier phase reference. The result of this detection process is a sequence of encoded data symbols.

A property of the PN sequence as used in the present invention is that discrimination is provided against multipath signals. When the signal arrives at the mobile receiver after passing through more than one path, there will be a difference in the reception time of the signal. This reception time difference corresponds to the difference in distance divided by the velocity of propagation. If this time difference exceeds one microsecond, then the correlation process will discriminate between the paths. The receiver can choose whether to track and receive the earlier or later path. If two receivers are provided, such as receivers 210 and 212, then two independent paths can be tracked and processed in parallel.

Searcher receiver 214, under control of control processor 216 is for continuously scanning the time domain around the nominal time of a received pilot signal of the microcell for other multi-path pilot signals. Receiver 214 will measure the strength of any reception of a desired waveform at times other than the nominal time. Receiver 214 compares signal strength in the received signals. Receiver 214 provides a signal strength signal to control processor 214 indicative of the strongest signals. Processor 216 provides control signals to data receivers 210 and 212 for each to process a different one of the strongest signals.

Control processor 216 also includes a PN generator which generates the user PN sequence in response to an input mobile unit address or user ID. The PN sequence output from the PN generator is provided to diversity combiner and decoder circuitry 218. Since the microcell-to-mobile signal is scrambled with the mobile user address PN sequence, the output from the PN generator is used in descrambling the cell-site transmitted signal intended for this mobile user similar to that as in the microcell receiver. The PN generator specifically provides the output PN sequence to deinterleaver and decoder circuitry where it is used to descramble the scrambled user data. Although scrambling is discussed with reference to a PN sequence, it is envisioned that other scrambling techniques including those well known in the art may be utilized.

The outputs of receivers 210 and 212 are thus provided to diversity combiner and decoder circuitry 218. The diversity combiner circuitry contained within circuitry 218 simply adjusts the timing of the two streams of received symbols into alignment and adds them together. This addition process may be proceeded by multiplying the two streams by a number corresponding to the relative signal strengths of the two streams. This operation can be considered a maximal ratio diversity combiner. The resulting combined signal stream is then decoded using a forward error correction (FEC) decoder also contained within circuitry 218. The usual digital baseband equipment is a digital vocoder system. The CDMA system is designed to accommodate a variety of different vocoder designs.

Baseband circuitry 220 typically includes a digital vocoder (not shown) which may be a variable rate type as disclosed in the previously mentioned copending patent application. Baseband circuitry 220 further serves as an interface with a handset or any other type of peripheral device. Baseband circuitry 220 accommodates a variety of different vocoder designs. Baseband circuitry 220 provides output information signals to the user in accordance with the information provided thereto from circuitry 218.

In the mobile-to-microcell link, user analog voice signals are typically provided through a handset as an input to baseband circuitry 220. Baseband circuitry 220 includes an analog to digital (A/D) converter (not shown) which converts the analog signal to digital form. The digital signal is provided to the digital vocoder where it is encoded. The vocoder output is provided to a forward error correction (FEC) encoding circuit (not shown) for error correction. In the exemplary embodiment the error correction encoding implemented is of a convolutional encoding scheme. The digitized encoded signal is output from baseband circuitry 220 to transmit modulator 222.

Transmit modulator 222 first Walsh encodes the transmit data and then modulates the encoded signal on a PN carrier signal whose PN sequence is chosen according to the assigned address function for the call. The PN sequence is determined by control processor 216 from call setup information that is transmitted by the cell-site and decoded by receivers 210 and 212, and control processor 216. In the alternative, control processor 216 may determine the PN sequence through prearrangement with the cell-site. Control processor 216 provides the PN sequence information to transmit modulator 222 and to receivers 210 and 212 for call decoding.

The output of transmit modulator 222 is provided to transmit power control circuitry 208. Signal transmission power is controlled by the analog power control signal provided from receiver 204. Control bits transmitted by the microcell in the form power adjustment command are processed by data receivers 210 and 212. The power adjustment command is used by control processor 216 in setting the power level in mobile unit transmission. In response to this command, control processor 216 generates a digital power control signal that is provided to circuitry 208. Further information on the relationship of receivers 210, 212 and 214, control processor 216 and transmit power control 208 with respect to power control is further described in the above-mentioned copending patent application.

Transmit power control circuitry 208 outputs the power controlled modulated signal to transmit power amplifier circuitry 206. Circuitry 206 amplifies and converts the IF signal to an RF frequency by mixing with a frequency synthesizer output signal which tunes the signal to the proper output frequency. Circuitry 206 includes an amplifier which amplifies the power to a final output level. The intended transmission signal is output from circuitry 206 to diplexer 202. Diplexer 202 couples the signal to antenna 200 for transmission to the microcell.

With respect to transmission by the mobile unit, the mobile user analog voice signal is first passed through a digital vocoder. The vocoder output is then, in sequence, convolutional forward error correction (FEC) encoded, 64-ary orthogonal sequence encoded and modulated on a PN carrier signal. The 64-ary orthogonal sequence is generated by a Walsh function encoder. The encoder is controlled by collecting six successive binary symbol outputs from the convolutional FEC encoder. The six binary collectively determine which of the 64 possible Walsh sequences will be transmitted. The Walsh sequence is 64 bits long. Thus, the Walsh "chip" rate must be $9600 \cdot 3 \cdot (1/6) \cdot 64 = 307200$ Hz for a 9600 bps data transmission rate.

In the mobile-to-microcell link, a common short PN sequence is used for all voice carriers in the system, while user address encoding is done using the user PN sequence generator. The user PN sequence is uniquely assigned to the mobile for at least the duration of the call. The user PN sequence is exclusive-OR'ed with the common PN sequences, which are length 32768 augmented maximal linear shift register sequences. The resulting binary signals then each bi-phase modulate a quadrature carrier, are summed to form a composite signal, are bandpass filtered, and translated to an IF frequency output. In the exemplary embodiment, a portion of the filtering process is actually carried out by a finite impulse response (FIR) digital filter operating on the binary sequence output.

The modulator output is then power controlled by signals from the digital control processor and the analog receiver, converted to the RF frequency of operation by mixing with a frequency synthesizer which tunes the signal to proper output frequency, and then amplified to the final output level. The transmit signal is then passed on to the diplexer and the antenna.

In mobile unit transmit modulator 222, data is provided in digital form from the user digital baseband circuitry to an encoder where in the exemplary embodiment is convolutionally encoded, block encoded and Walsh encoded.

Transmit modulator further includes a PN generator which receives the mobile unit address as an input in determining the output PN sequence. This PN generator generates the user specific 42-bit sequence as was discussed to the microcell. A further attribute of this PN generator that is common to all user PN generators and not previously discussed is the use of a masking technique in generating the output user PN sequence. For example, a 42-bit mask is provided for that user with each bit of the 42-bit mask exclusive-OR'ed with a bit output from each register of the series of shift register that form the PN generator. The results of the mask and shift register bit exclusive-OR operation are then exclusive-OR'ed together to form the PN generator output that is used as the user PN sequence.

Transmit modulator 222 includes PN generators which generate the $PN_I$ and $PN_Q$ sequences which all mobile units use. These PN sequences are in the exemplary embodiment the zero-shift used in the microcell-to-mobile communications.

In the exemplary embodiment, the mobile-to-cell link uses rate $r=\frac{1}{3}$ convolutional code with constraint length $K=9$. The generators for the code are $G_1=557$ (octal), $G_2=663$ (octal), and $G_3=711$ (octal). Similar to the cell-to-mobile link, code repetition is used to accommodate the four different data rates that the vocoder produces on a 20 msec frame basis. Unlike the microcell-to-mobile link, the repeated code symbols are not transmitted over the air at lower energy levels, rather only one code symbol of a repetition group is transmitted at the nominal power level. In conclusion, the code repetition in the exemplary embodiment is used merely as an expedient to fit the variable data rate scheme in the interleaving and modulation structure as it will be shown in the following paragraphs.

A block interleaver spanning 20 msec, exactly one vocoder frame, is used in the mobile-to-cell link. The number of code symbols in 20 msec, assuming a data rate of 9600 bps and a code rate $r=\frac{1}{3}$, is 576. The N and B parameters, N is equal to the number of rows and B to the number of columns of the interleaver array are 32 and 18, respectively. The code symbols are written into the interleaver memory array by rows and read out by columns.

The modulation format is 64-ary orthogonal signalling. In other words, interleaved code symbols are grouped into groups of six to select one out of 64 orthogonal waveforms. The 64 time orthogonal waveforms are the same Walsh functions used as cover sequences in the cell-to-mobile link.

The data modulation time interval is equal to 208.33 μsec, and is referred to as a Walsh symbol interval. At 9600 bps, 208.33 μsec corresponds to 2 information bits and equivalently to 6 code symbols at a code symbol rate equal to 28800 sps. The Walsh symbol interval is subdivided into 64 equal length time intervals, referred to as Walsh chips, each lasting 208.33/64=3.25 μsec. The Walsh chip rate is then 1/3.25 μsec=307.2 kHz. Since the PN spreading rate is symmetric in the two links, i.e. 1.2288 MHz, there are exactly 4 PN chips per Walsh chip.

A total of three PN generators are used in the mobile-to-cell link path. The user specific 42-bit PN generator and the pair of 15-bit I and Q channel PN generators. Following the user specific spreading operation, the signal is QPSK spread as it was done in the cell-to-mobile link. Unlike the cell-to-mobile link, where each sector or cell was identified by unique sequences of length $2^{15}$, here all mobile units use the same I and Q PN sequences. These PN sequences are the zero-shift sequences used in the cell-to-mobile link, also referred to as the pilot sequences.

Code repetition and energy scaling are used in the microcell-to-mobile link to accommodate the variable rates produced by the vocoder. The mobile-to-microcell link uses a different scheme based on a burst transmission.

The vocoder produces four different data rates, i.e. 9600, 4800, 2400, and 1200 bps, on a 20 msec frame basis as in the cell-to-mobile link. The information bits are encoded by the rate $r=\frac{1}{3}$ convolutional encoder and code symbols are repeated 2,4, and 8 times at the three lower data rates. Thus, the code symbol rate is kept constant at 28800 sps. Following the encoder, the code symbols are interleaved by the block interleaver which spans exactly one vocoder frame or 20 msec. A total of 576 code symbols are generated every 20 msec by the convolutional encoder, some of which might be repeated symbols.

A vocoder frame of 20 msec is subdivided into 16 slots each lasting 1.25 msec. The numerology of the mobile-to-cell link is such that in each slot there are 36 code symbols at the 28800 sps rate or equivalently 6 Walsh symbols at the 4800 sps rate. At the $\frac{1}{2}$ rate, i.e. 4800 bps, the slots are grouped into 8 groups each comprising 2 slots. At the $\frac{1}{4}$ rate, i.e. 2400 bps, the slots are grouped into 4 groups each comprising 4 slots, and finally at the $\frac{1}{8}$ rate, i.e. 1200 bps, the slots are grouped into 2 groups each comprising 8 slots.

The mobile unit in order to originate a call must be provided with signaling attributes in order to complete a call to another system user via a cell-site. In the mobile-to-microcell link the envisioned access technique is the slotted ALOHA. An exemplary transmission bit rate on the reverse channel is 4800 bps. An access channel packet is comprised of a preamble followed by the information.

The preamble length is in the exemplary embodiment an integer multiple of 20 msec frames and is a sector/cell parameter which the mobile receives in one of the paging channel messages. Since the cell receivers use the preambles to resolve propagation delays this scheme allows the preamble length to vary based on the cell radius. The users PN code for the access channel is either prearranged or transmitted to the mobile units on the paging channel.

The modulation is fixed and constant for the duration of the preamble. The orthogonal waveform used in the preamble is $W_0$, i.e. the all zero Walsh function. Notice that an all zero pattern at the input of the convolutional encoder generates the desired waveform $W_0$.

An access channel data packet may consist of one or at most two 20 msec frames. The coding, interleaving, and modulation of the access channel is exactly the same as for a voice channel at the 4800 bps rate, except that the transmission is not bursted in nature and all code symbols transmitted. In an exemplary embodiment, the sector/cell requires the mobile units to transmit a 40 msec preamble and the access channel message type requires one data frame. Let Np be the number of preamble frames where k is the number of 20 msec elapsed from a predefined time origin. Then mobiles are allowed to initiate transmission on the access channel only when the equation: $(k, Np+2)=0$ is true.

With respect to other communications applications it may be desirable to rearrange the various elements of the error correction coding, the orthogonal sequence coding and the PN coding to better fit the application.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a code division multiple access (CDMA) communication system in which system users communicate information signals with other system users through a base station using CDMA communication signals, said base station having an antenna system comprising:
    a plurality of spaced apart antennas;
    signal distribution means for coupling CDMA communication signals between a base station and said antennas; and
    delay means operatively coupled to said antennas and said signal distribution means for providing a predetermined delay in said CDMA communication signals coupled between said base station and said antennas.

2. The system of claim 1 wherein said signal distribution means comprises transmission cabling serially interconnecting said antennas and interconnecting a first one of said antennas to said base station.

3. The system of claim 2 wherein said CDMA communication signals are generated by spread spectrum modulating said information signals according to a pseudorandom noise (PN) spreading code comprised of a predetermined sequence of binary chips each of a predetermined chip duration, and wherein said delay means comprises a plurality of delay elements disposed in said cabling between adjacent coupled ones of said antennas, each delay element providing a delay in said CDMA communication signals on an order of at least one chip duration.

4. The system of claim 1 wherein said antennas each have a predetermined antenna pattern with said antennas positioned with overlapping patterns.

5. The system of claim 4 wherein said antennas are positioned with substantially overlapping patterns.

6. The system of claim 1 wherein said signal distribution means comprises:
    a local antenna electrically coupled to said base station; and
    a plurality of remote antennas electromagnetically coupled to said local antenna, with each remote antenna coupled to a corresponding one of said antennas.

7. The system of claim 6 wherein said CDMA communication signals are generated by spread spectrum modulating said information signals according to a pseudorandom noise (PN) spreading code comprised of a predetermined sequence of binary chips each of a predetermined chip duration, and wherein said delay means comprises a plurality of delay elements each disposed between corresponding ones of said antennas and remote antennas, each delay element providing a delay in said CDMA communication signals on an order of at least one chip duration.

8. The system of claim 6 wherein said antennas each have a predetermined antenna pattern with said antennas positioned with overlapping patterns.

9. The system of claim 8 wherein said antennas are positioned with substantially overlapping patterns.

10. In a communication system in which system users communicate through a base station with remote system users, said remote system users communicating through said base station via a radio link therewith, said base station comprising:
    communication terminal means for receiving and spread spectrum modulating a system user information signal; and
    antenna means for, receiving said spread spectrum modulated system user information signal, providing multiple radiations of said spread spectrum modulated system user information signal with each radiation of said spread spectrum modulated system user information signal of a predetermined time delay with respect to one another.

11. The system of claim 10 wherein said antenna means comprises:
    a plurality of spaced apart antennas;
    signal distribution means for coupling said spread spectrum modulated system user information signal from said communication terminal means to each of said antennas; and
    delay means operatively coupled to said antennas and said signal distribution means for providing a different predetermined delay in said spread spectrum modulated system user information signal as coupled by said signal distribution means to each of said antennas.

12. The system of claim 11 wherein said spread spectrum modulated system user information signal is generated by direct sequence spread spectrum modulating said system user information signal with a pseudorandom noise (PN) spreading code comprised of a predetermined sequence of binary chips each of a predetermined chip duration.

13. The system of claim 12 wherein said delay means comprises a plurality of delay elements each operatively coupled to a respective one of said antennas, each delay element providing a respective delay in said spread spectrum modulated system user information signal, with each delay different from one another by an order of at least one chip duration.

14. The system of claim 13 wherein said signal distribution means comprises a cabling system interconnecting in series said communications terminal and said antennas.

15. The system of claim 13 wherein said signal distribution means comprises:
 a primary antenna coupled to said base station; and
 a plurality of secondary antennas electromagnetically coupled to said primary antenna, with each secondary antenna coupled to a corresponding one of said antennas and respective one of said delay elements.

16. The system of claim 11 wherein said antennas comprise omnidirectional antennas.

17. The system of claim 11 wherein said antennas comprise directional antennas.

18. In the communication system of claim 11 wherein said remote system users communicate with said system users and other remote system users through said base station by transmitting spread spectrum modulated remote system user information signals to said base station for transfer to intended recipient system users and remote system users, said antennas collecting remote system user transmitted spread spectrum modulated remote system user information signal, said signal distribution means for coupling said collected spread spectrum modulated remote system user information signal from said antennas to said communication terminal means and said delay means providing each antenna collected spread spectrum modulated remote system user information signal with a predetermined time offset with respect to one another as provided by said signal distribution means to said communication terminal means.

19. The system of claim 18 wherein said spread spectrum modulated system user information signal and said spread spectrum modulated remote system user information signal are generated by respectively direct sequence spread spectrum modulating said system user information signal and said remote system user information signal with a pseudorandom noise (PN) spreading code comprised of a predetermined sequence of binary chips each of a predetermined chip duration.

20. In the communication system of claim 10 wherein said remote system users communicate with said system users and other remote system users through said base station by transmitting spread spectrum modulated remote system user information signals to said base station for transfer to intended recipient system users and remote system users, said antenna means further for performing multiple collections of a remote system user transmitted spread spectrum modulated remote system user information signal, providing each multiple collection of said spread spectrum modulated remote system user information signal of a predetermined time offset with respect to one another, and providing each of said time offset ones of said spread spectrum modulated remote system user information signal to said communication terminal means.

21. The system of claim 20 wherein said spread spectrum modulated system user information signal is generated by direct sequence spread spectrum modulating said system user information signal with a first pseudorandom noise (PN) spreading code comprised of a first predetermined sequence of binary chips each of a first predetermined chip duration and said spread spectrum modulated remote system user information signal is generated by direct sequence spread spectrum modulating said remote system user information signal with a second pseudorandom noise (PN) spreading code comprised of a second predetermined sequence of binary chips each of a second predetermined chip duration.

22. The system of claim 10 wherein said spread spectrum modulated system user information signal is generated by direct sequence spread spectrum modulating said system user information signal with a pseudorandom noise (PN) spreading code comprised of a predetermined sequence of binary chips each of a predetermined chip duration.

23. A local communication system for facilitating the communication of information signals between users of said local communication system, and between users of said local communication system with users of an external network, wherein certain users of said local communication system use remote terminals to communicate within said local communication system, via a radio link with a base station, using code division multiple access communication signals, said system comprising:
 a private branch exchange (PBX);
 a base station coupled to said PBX comprising:
  communication terminal means for receiving and direct sequence spread spectrum modulating an information signal intended for a recipient remote terminal user with a pseudorandom noise (PN) spreading code comprised of a predetermined sequence of binary chips each of a predetermined chip duration time; and
  antenna means for, receiving said spread spectrum modulated information signal, providing multiple radiations of said spread spectrum modulated information signal with each radiation of said spread spectrum modulated information signal delayed in time with respect to one another by at least one chip duration time.

24. The system of claim 18 wherein said antenna means comprises:
 a plurality of spaced apart antennas;
 signal distribution means for coupling said spread spectrum modulated information signal from said communication terminal means to each of said antennas; and
 delay means operatively coupled to said antennas and said signal distribution means for providing an incremental one chip duration time delay in said spread spectrum modulated information signal as coupled by said signal distribution means to each of said antennas.

25. In the communication system of claim 24 said PBX is coupled to said external network and a network of local users in said local communication system.

26. In the communication system of claim 25 wherein said remote terminal users communicate with said users of said external network, said local users of said local communication system, and other remote terminal users of said local communication system through said base station by transmitting spread spectrum modulated remote terminal user information signals to said base station for transfer to an intended recipient users, said antennas collecting remote terminal user transmitted spread spectrum modulated remote terminal user information signal, said signal distribution means for coupling said collected spread spectrum modulated remote terminal user information signal from said antennas to said communication terminal means and said delay means providing each antenna collected spread spectrum modulated remote terminal user information signal with a predetermined time offset with respect to one another as provided by said signal distribution means to said communication terminal means.

27. In a communication system where information signals intended for transfer to a receiving terminal are transmitted from a transmitting terminal as code division multiple access communication (CDMA) signals, wherein said receiving terminal in receiving multipath propagations of each transmitted CDMA communication signal requires a minimum predetermined time difference between multipath propagations of each transmitted CDMA communication signal as received for demodulation thereof to provide said information signals intended for said receiving terminal, a method for creating multipath propagations of said transmitted CDMA signals wherein each multipath propagation is of at least said minimum predetermined time difference with respect to another upon reception at said receiving terminal, said method comprising the steps of:
 providing a plurality of spaced apart antennas;
 providing from said transmitting terminal a CDMA communication signal to each of said antennas; and
 providing a different predetermined delay in said CDMA communication signal as provided to each of said antennas.

28. The method of claim 27 wherein said CDMA communication signals in said transmitting terminal are generated by spread spectrum modulating said information signals according to a pseudorandom noise (PN) spreading code comprised of a predetermined sequence of binary chips each of a predetermined chip duration, and wherein in said step of providing said different predetermined delay in said CDMA communication signal as provided to each of said antennas each delay being different from one another on an order of at least one chip duration.

29. In a communications system in which an information signal is modulated at a first station with a pseudorandom noise (PN) code, comprised of a predetermined sequence of code chips each of a predetermined time duration, with said PN modulated noise signal modulated upon a carrier for transmission, an antenna system comprising:
 a plurality of antennas coupled in series to said first station; and
 a plurality of delay elements each disposed in series between adjacent coupled ones of said antennas.

30. The system of claim 29 wherein said antennas are omnidirectional antennas positioned with overlapping patterns.

31. The system of claim 29 wherein said antennas are directional antennas positioned with overlapping patterns.

32. The system of claim 29 wherein each of said delay elements provides a delay on the order of least said predetermined time duration of said code chips.

33. The system of claim 29 in which an second information signal is modulated at second station with a second pseudorandom noise (PN) code, comprised of a second predetermined sequence of code chips each of second predetermined time duration, said second PN modulated noise signal modulated upon a second carrier for transmission, a second antenna system comprising at least one antenna for receiving said PN modulated noise signal transmitted from said first station from at least one said plurality of antennas and for transmitting said second PN modulated noise signal modulated by said second carrier to at least one said plurality of antennas.

34. An antenna system for transmitting and/or receiving a spread spectrum modulated information signal wherein said spread spectrum modulated information signal is generated by spread spectrum modulating an information signal with a pseudorandom noise code comprised of a predetermined sequence of code chips each of a predetermined chip duration, said antenna system comprising:
 a primary antenna system comprising a main antenna and a first set of antennas, said primary antenna system for electromagnetically coupling signals between said main antenna and said first set of antennas;
 a second set of antennas, each of said second set of antennas coupled to a corresponding one of said first set of antennas;
 a set of delay elements, each delay element disposed between a respective one of said second set of antennas and a corresponding one of said first set of antennas and providing a delay time on the order of an integer multiple of one chip duration.

35. The system of claim 34 wherein each of said delay elements provides a different delay corresponding to a different integer multiple of one chip duration.

36. An antenna system for transmitting and/or receiving a spread spectrum modulated information signal wherein said spread spectrum modulated information signal is generated by spread spectrum modulating an information signal with a pseudorandom noise code comprised of a predetermined sequence of code chips each of a predetermined chip duration, said antenna system comprised of at least one antenna subsystem each comprising:
 a set of delay elements, each delay element providing a delay time on the order of an integer multiple of one chip duration in length;
 a set of antennas; and
 a system of cabling coupling together said antennas and said delay elements in a serial string, wherein said delay elements are coupled between predetermined pairs of said antennas.

37. The system of claim 36 wherein multiple antenna subsystems are arranged as a parallel array with a first antenna in each antenna subsystem serial string coupled to a common feed.

* * * * *